United States Patent [19]

Shibata et al.

[11] Patent Number: 5,389,905
[45] Date of Patent: Feb. 14, 1995

[54] DAMPER, ELECTROMAGNET ASSEMBLY EMPLOYING THE DAMPER, AND RELAY EMPLOYING THE ELECTROMAGNET ASSEMBLIES

[75] Inventors: Kiwamu Shibata; Yoichi Yokoyama; Manabu Yano; Nobuhiro Kitamura; Naoki Kanemoto; Tetsuyasu Kawamoto, all of Kadoma, Japan

[73] Assignee: Matsushita Electric Works, Ltd., Osaka, Japan

[21] Appl. No.: 46,984

[22] Filed: Apr. 15, 1993

[30] Foreign Application Priority Data

Apr. 22, 1992 [JP] Japan ................................ 4-103038
Apr. 22, 1992 [JP] Japan ................................ 4-103039
Aug. 24, 1992 [JP] Japan ................................ 4-224297
Oct. 20, 1992 [JP] Japan ................................ 4-281406

[51] Int. Cl.⁶ ......................................... H01H 51/22
[52] U.S. Cl. ........................................ 335/78; 335/80
[58] Field of Search ................................ 335/78–80, 335/12 T, 12 F, 131–133

[56] References Cited

U.S. PATENT DOCUMENTS 4,840,359  6/1989  Hamaekers et al. ............ 267/140.1
4,878,650  11/1989 Daly et al. .
4,910,484  3/1990  Shikano et al. .
4,963,847  10/1990 Cambreleng et al. .
5,132,496  7/1992  Lee .................................. 200/288
5,150,090  9/1992  Miura et al. ..................... 335/84

FOREIGN PATENT DOCUMENTS 48-89361  11/1973  Japan .

Primary Examiner—Lincoln Donovan
Attorney, Agent, or Firm—Burns, Doane, Swecker & Mathis

[57] ABSTRACT

A damper is provided by a plurality of chambers defined between stacked thin sheet members and containing a fluid for flowing therein through a communicating section, the chambers being made to be of a small height in the direction perpendicular to the plane of the sheet members and to form a buffer section with at least one of the chambers. With such damper employed in electromagnet assemblies and eventually relays including the assemblies, they can be sufficiently minimized in size, and their manufacture can be also made extremely easier.

25 Claims, 26 Drawing Sheets

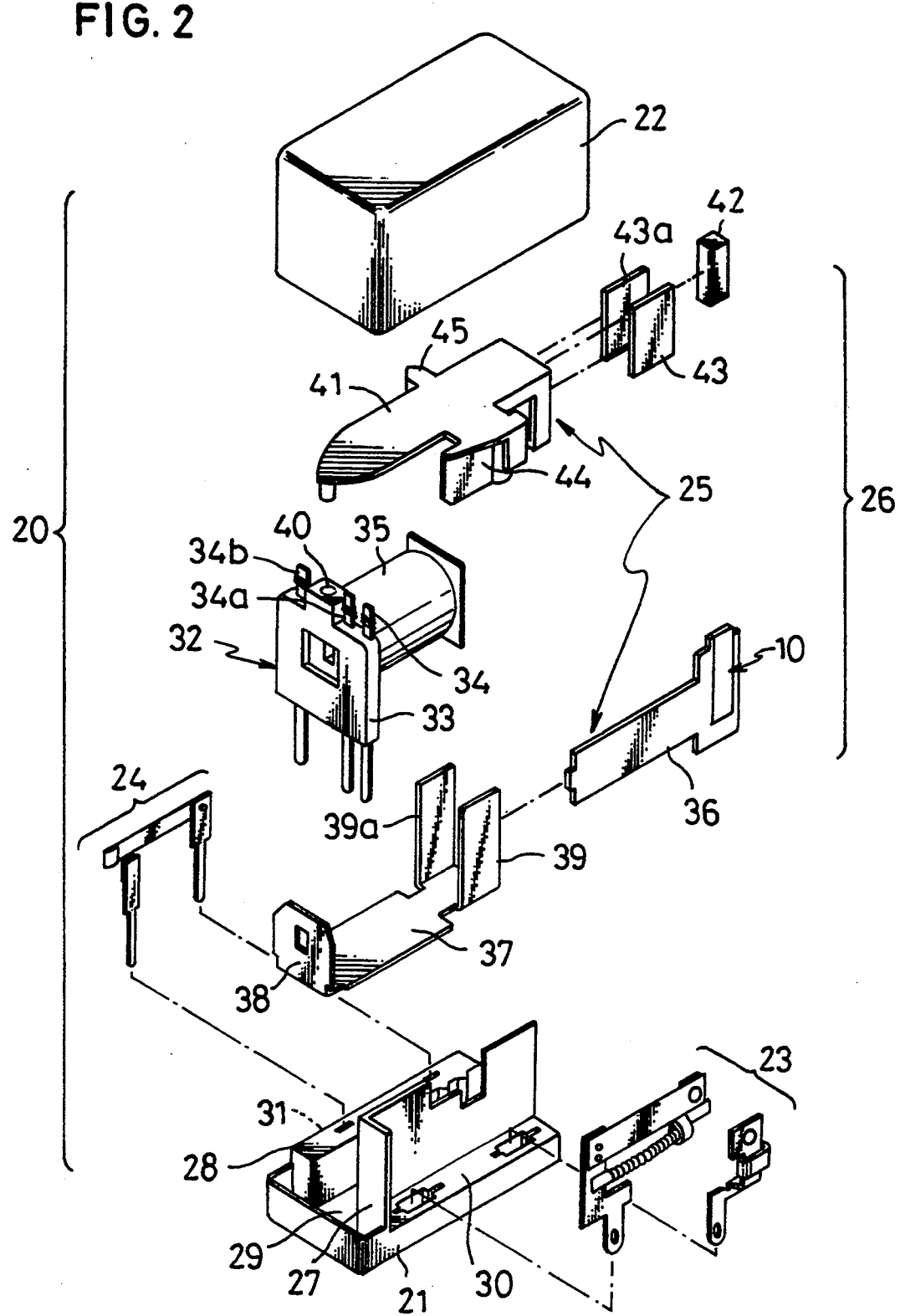

FIG. 34
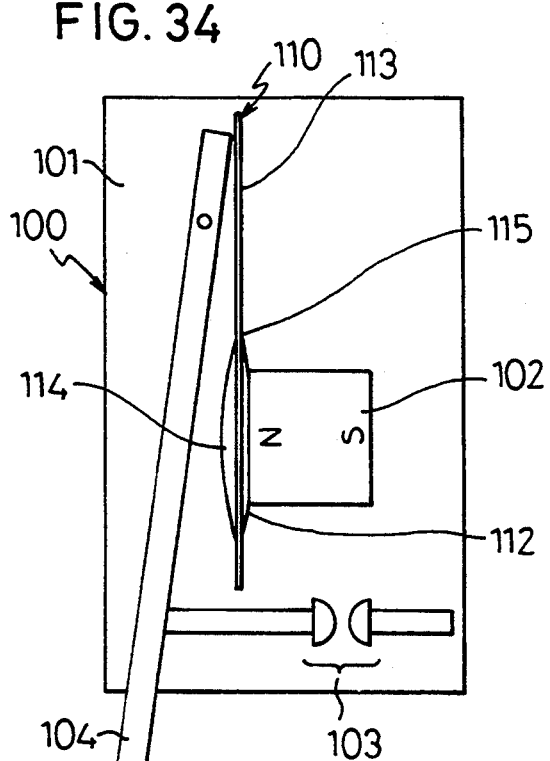
FIG. 35
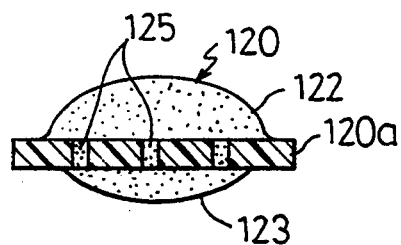
FIG. 36
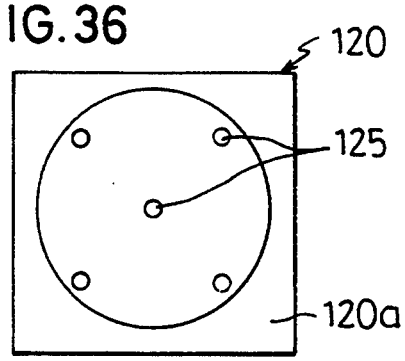
FIG. 37
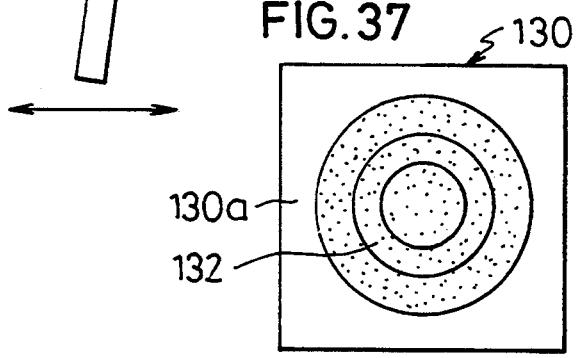
FIG. 39
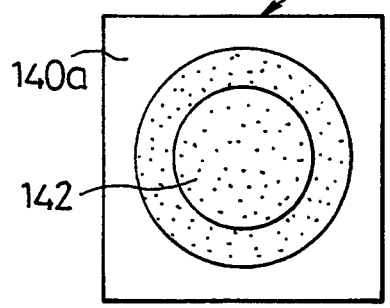
FIG. 38
FIG. 40
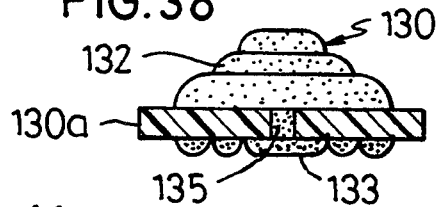
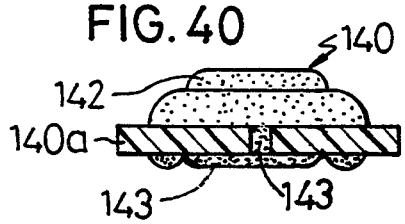
FIG. 41
FIG. 42
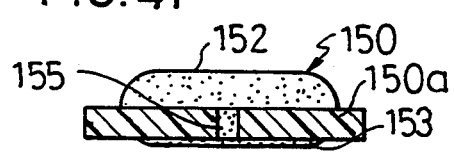
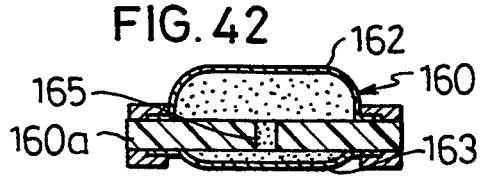

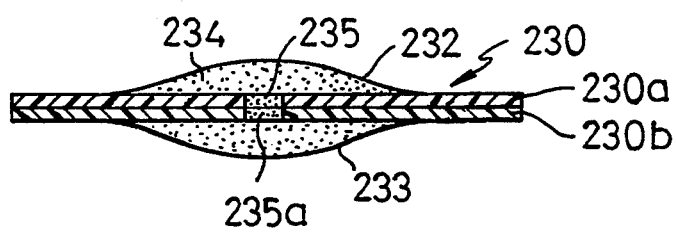
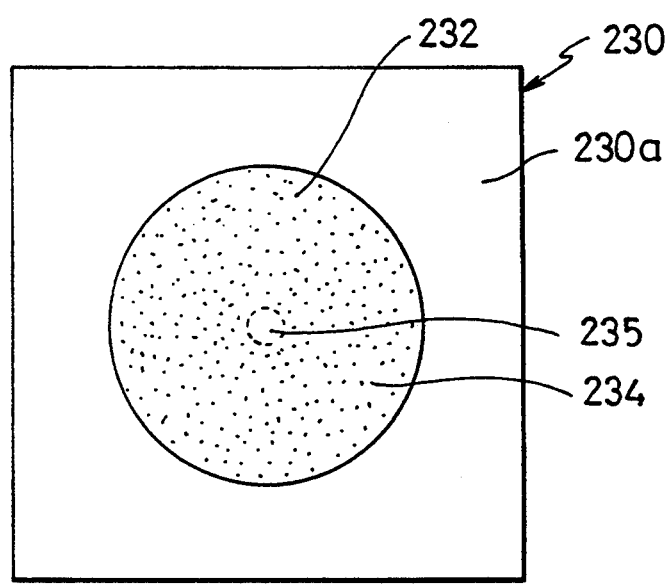
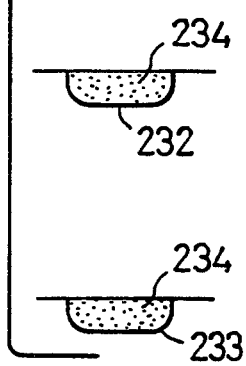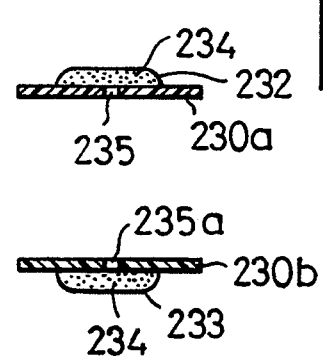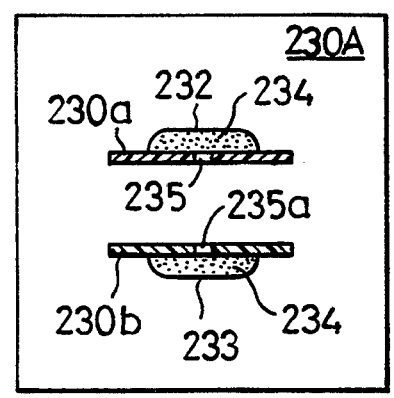
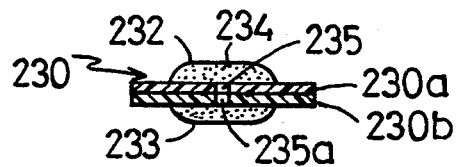

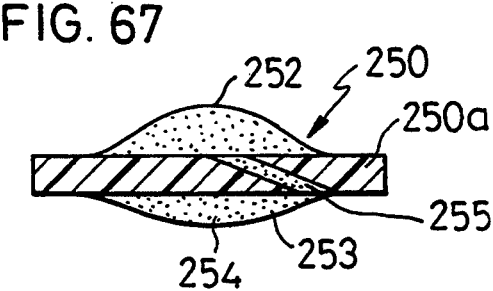
FIG. 67
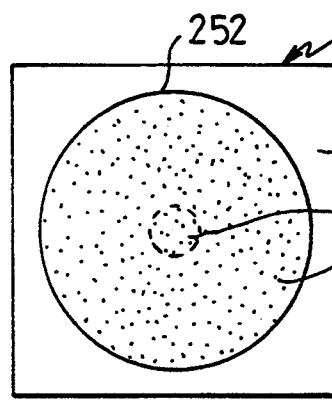
FIG. 68
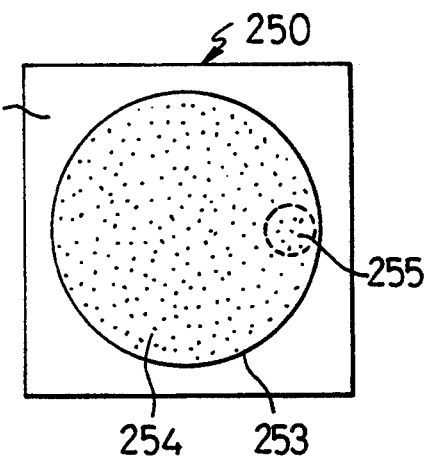
FIG. 69
FIG. 70a
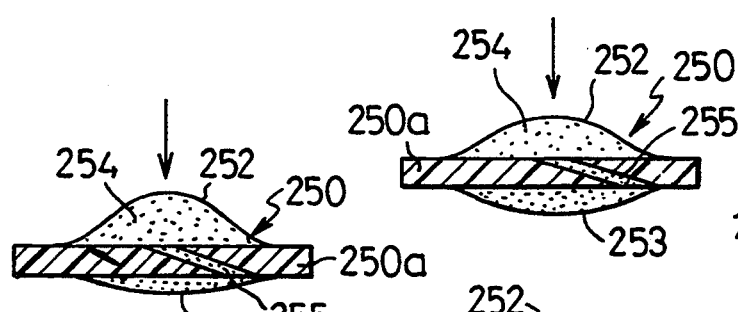
FIG. 70b
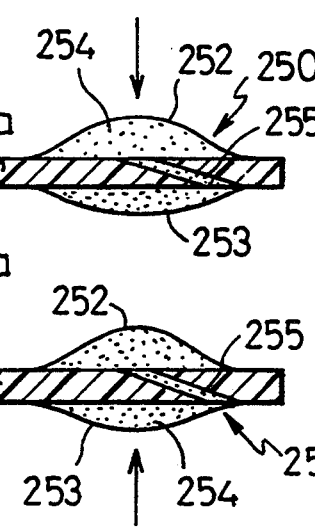
FIG. 70c
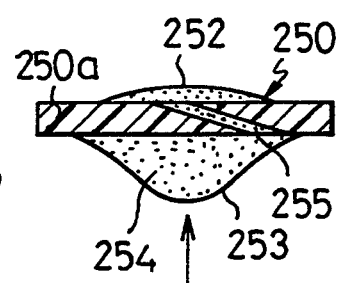
FIG. 70d
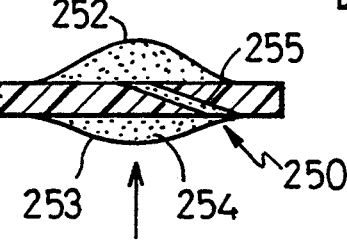

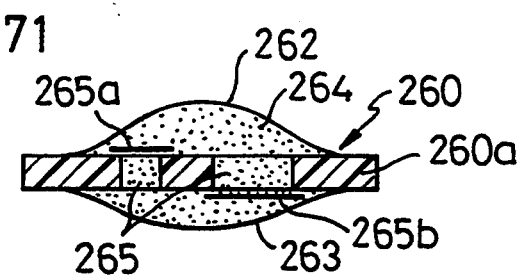
FIG. 71
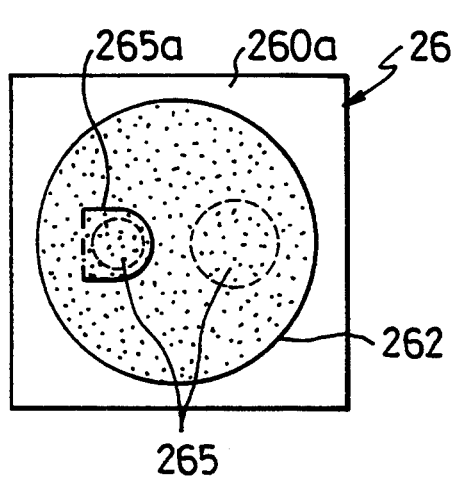
FIG. 72
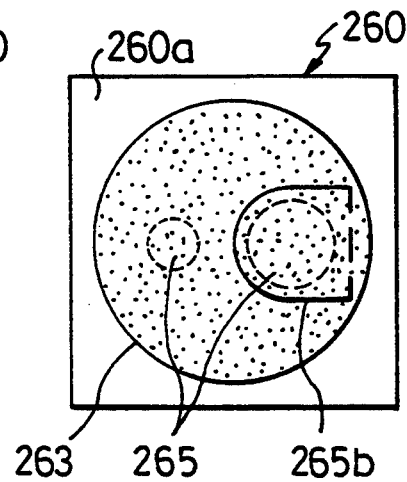
FIG. 73
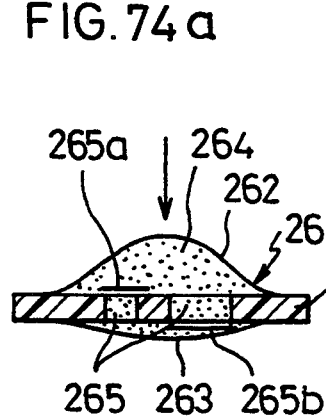
FIG. 74a
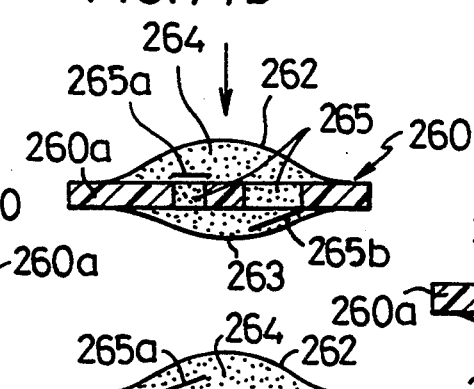
FIG. 74b
FIG. 74d
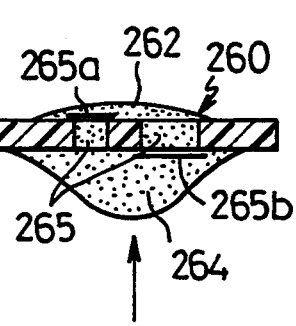
FIG. 74c

DAMPER, ELECTROMAGNET ASSEMBLY EMPLOYING THE DAMPER, AND RELAY EMPLOYING THE ELECTROMAGNET ASSEMBLIES

BACKGROUND OF THE INVENTION

This invention relates to a damper of a novel structure excellent in buffer action, an electromagnet assembly employing this novel damper for effectively reducing impinging noise occurring upon operation, and a relay in which the electromagnet assembly is employed, with the impinging noise occurring upon operation in the electromagnet assembly remarkably reduced and with any occurrence of contacting trouble restrained.

DESCRIPTION OF RELATED ART

Generally, the relay or switch including the electromagnet, for example, generates a noise or a vibration due to colliding action of movable elements upon the operation. Accordingly, the use of relay or switch as incorporated in householding electric equipments, automobiles and so on, the impinging noise or vibration will be a problem.

In U.S. Pat. No. 4,910,484 to Y. Shikano et al, for example, there has been suggested a buffer action realized by a fluid made fluidizable within a cylinder of a cylinder-piston assembly employed as a movable member. In this instance, such additional member as the cylinder-piston assembly or the like is required to be relatively large in size, and there arise problems that means for attaining the buffer action has to be large in outer dimensions, the cylinder and piston are required to be sufficiently so high in mutual fitting precision that the manufacturing is rendered to be complicated, and a use of any special one of liquid or gas to be sealed in the cylinder requires a sealing member, so as to render the manufacturing costs to be increased.

In U.S. Pat. No. 4,963,847 to P. S. Cambreleng et al and U.S. Pat. No. 4,878,650 to P. D. Daly et al, on the other hand, there have been suggested damper arrangements in which a coil spring and viscous fluid are utilized for attaining the buffer action. In these cases, too, such relatively large size buffer member as the coil spring or the like is required, so that there will arise such problems that means for carrying out the buffer action has to become large in the outer dimensions so as to be inconvenient to be used in, for example, relays and switches attempted to be minimized in size, and, in addition, it is necessary for realizing the excellent buffer action to execute a setting of buffer force at a high precision enough for rendering the assembling work to be remarkably complicated.

In Japanese Patent Laid-Open Publication No. 48-89361 by H. Kondo et al, the same assignee as in the present invention, there has been suggested an arrangement for attaining the buffer action upon closing operation of a movable member with respect to a stationary member in electromagnet contactor by means of a bellows type bag disposed between the movable and stationary members. In this instance, this buffer means has been simple in the structure and excellent in the assembling ability to be deemed an epoch-making arrangement in the years of 1970's on one hand, but the bag as the buffer means has taken the multistage bellows type so as to require a larger space in the height or expanding direction of the bellows so that, on the other hand, the buffer means has been less advantageous to be employed in the relays and switches a high level minimization in size, for example, of which has been demanded. In forming the bag into the bellows type, further, its manufacture may have to rely on a blowing, which involves complicated works in contrast to a drawing which is to be employed in manufacturing the damper according to the present invention, and there has been a trouble that the yielding has not been easily maintained at a high level.

SUMMARY OF THE INVENTION

A primary object of the present invention is, therefore, to provide a damper which requires only the minimum required installing space for being optimumly employable in the relays, switches and the like demanding a high level dimensional minimization, and which is easy to manufacture; an electromagnet assembly in which the damper is employed; and a relay in which the electromagnet assembly is employed.

According to the present invention, the object can be realized by means of a damper comprising a plurality of chambers and a fluid encapsulated in the chambers which are mutually coupled through a communicating section, wherein the respective chambers are defined between thin sheet members to be of a small height in the direction vertical to the plane of the sheet members, and at least one of the chambers forms a buffer section.

Other objects and advantages of the present invention shall become clear as following description of the invention advances with reference to preferred embodiments shown in the drawings.

BRIEF EXPLANATION OF DRAWINGS

FIG. 2 shows in an exploded perspective view a relay in which the damper of FIG. 1 is employed;

FIG. 34 is a schematic view of a damper according to the present invention as applied to a switch;

FIG. 35 shows in a sectioned view a damper in another embodiment according to the present invention;

FIG. 36 is a plane view of the damper shown in FIG. 35;

FIG. 37 shows in a plane view a damper in still another embodiment according to the present invention;

FIG. 38 is a sectioned view of the damper of FIG. 37;

FIG. 39 is a plane view of a damper in still another embodiment according to the present invention;

FIG. 40 is a sectioned view of the damper shown in FIG. 39;

FIGS. 41 and 42 show in sectioned views dampers in further embodiments according to the present invention;

FIG. 60 shows in a sectioned view of a damper of another embodiment according to the present invention;

FIG. 61 is a plane view of the damper of FIG. 60;

FIGS. 62a through 62d are diagrams showing manufacturing steps for the damper of FIG. 60;

FIG. 67 shows in a sectioned view of a damper in another embodiment according to the present invention;

FIG. 68 is a plane view of the damper of FIG. 67;

FIG. 69 is a bottom view of the damper of FIG. 67;

FIGS. 70a through 70d are explanatory views for the operation of the damper of FIG. 67;

FIG. 71 is a sectioned view showing a damper in another embodiment according to the present invention;

FIG. 72 is a plane view of the damper of FIG. 71;

FIG. 73 is a bottom view of the damper of FIG. 71;

FIGS. 74a through 74d are explanatory views for the operation of the damper of FIG. 71;

Figure 1:
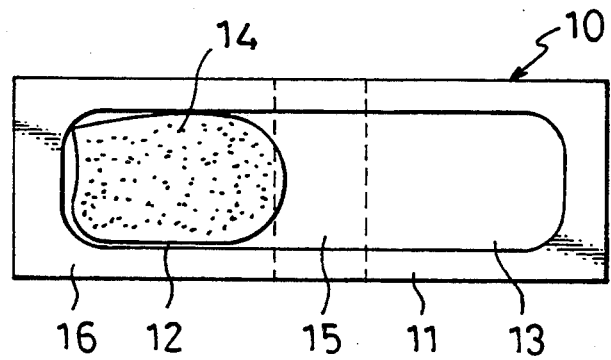
FIG. 1 is a plan view a damper in an embodiment according to the present invention.

While the present invention shall now be described with reference to the respective embodiments shown in the drawings, it will be appreciated that the intention is not to limit the present invention only to these embodiments, but rather to include all alterations, modifications and equivalent arrangements possible within the scope of appended claims.

DETAILED DESCRIPTION OF THE PREFERRED EMBODIMENTS

Referring now to FIG. 1, there is shown an embodiment of the damper according to the present invention, in which the damper 10 comprises a thin sheet member 11 forming a container in which first and second chambers 12 and 13 are defined, and a fluid 14 such as a gas or a liquid having preferably a viscosity and encapsulated in the first and second chambers 12 and 13, while the first and second chambers 12 and 13 are mutually connected through a communicating section 15 formed within the sheet member 11 for allowing the fluid 14 to flow between the chambers, so that at least one of the first and second chambers 12 and 13 will perform a buffer action upon application of external pressure to the chamber.

In this case, the sheet member 11 can be prepared from a sheet-shaped web material properly cut into a rectangular shape as seen in plane view. More specifically, the sheet-shaped web material of plastics, preferably of a fluoroplastic of 25 $\mu$m thick, for example, is cut into a predetermined dimension, two of the thus cut webs are stacked and hot-pressed at peripheral edges 16 with a proper amount of the viscous fluid 14, preferably silicone oil or the like encapsulated between the two sheets of webs, while defining the first and second chambers 12 and 13 and the communicating section 15 interposed between both chambers. For the amount of fluid 14 encapsulated, it is preferable to set the amount to correspond to a volume of one of the two chambers 13 and 14 while keeping the other chamber and the communicating section 15 to be hollow. In manufacturing the damper 10, it is possible to prepare a large number of the dampers in a series with two of the sheet-shaped webs made long as stacked and to cut the web into the respective dampers at portions between adjacent ones.

Figure 3:
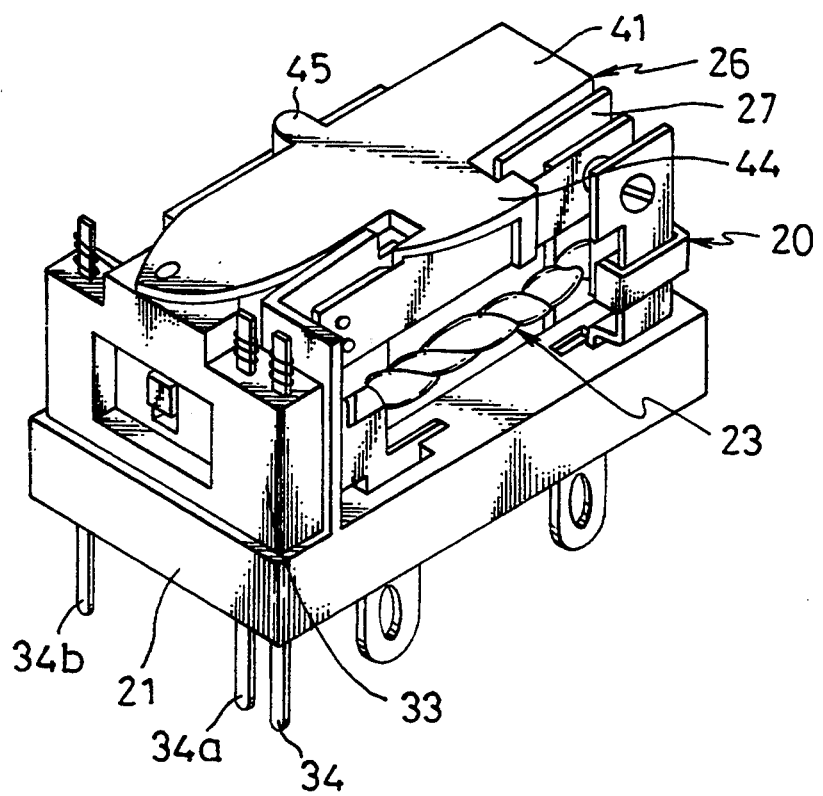
FIG. 3 shows also in an assembled perspective view the relay in FIG. 2, except for a cover removed for showing the interior.

The foregoing damper 10 is kept sufficiently small in height, i.e., in a direction perpendicular with respect to the plane of the sheet member 11, so as to be relatively almost flat in configuration, and can be optimumly incorporated into such relay 20 as shown in FIGS. 2 and 3, in particular, in its electromagnet assembly 26, without increasing the dimension of the relay 20.

Here, the relay 20 shown in FIGS. 2 and 3 itself is of a type generally used, as has been disclosed not to be any novel type but just as a well known and generally used type in, for example, U.S. Pat. No. 5,049,845 to Y. Yokoyama et al. Referring just briefly, therefore, this relay 20 is provided as a so-called remote controllable relay which comprises a base 21 and a cover 22 fitted over to the base 21 to form a casing. Within this casing, there is accommodated an electromagnet assembly 26 which includes a main contact means 23, a subsidiary contact means 24 and a contact operating means 25 for these contact means 23 and 24, and the foregoing damper 10 is added to the contact operating means 25 to provide to the assembly an effective buffer function.

More specifically, the base 21 is provided with mutually separated partitioning walls 27 and 28 erected for defining, together with the cover 22, a center chamber 29 and both side chambers 30 and 31. In the central chamber 29, there are accommodated not only the contact operating means 25 but also the electromagnet assembly 26 including an electromagnet device 32 linked to the operating means 25. The electromagnet device 32 comprises a coil bobbin 33 on which a coil 35 is wound for allowing currents to flow in mutually opposite directions through coil terminals 34, 34a and 34b, and through which a stationary core 36 is axially passed, while this stationary core 36 is held at its base end by a support section 38 of a yoke 37 and is provided at the other end with the damper 10. In this case, the communicating section 15 of the damper 10 is disposed on upper edge on the other end side of the core 36 so that both first and second chambers 12 and 13 will lie along both side faces of the core 36. The yoke 37 itself is formed to be U-shaped in side view, in which one end side upward leg forms the support section 38 and the other end side upward leg comprises a pair of magnetic pole sections 39 and 39a erected from both side edges of bottom section. In this case, the coil terminals 34, 34a and 34b of the bobbin 33 are led out of the base 21 downward.

The contact operating means 25 of the electromagnet assembly 26 includes a card 41 which is pivotably supported at a base end by a pivot projection 40 of the coil bobbin 33, and a pair of armatures 43 and 43a holding between them a permanent magnet 42 are secured to the other rocking side end of the card 41, which pair of armatures 43 and 43a are disposed to oppose both side faces of the stationary core 36 and eventually the first and second chambers 12 and 13 of the damper 10 carried on the core 36. The card 41 is further provided with main and subsidiary thrust projections 44 and 45 extended in lateral sideward rocking directions of the card 41.

Figure 4:
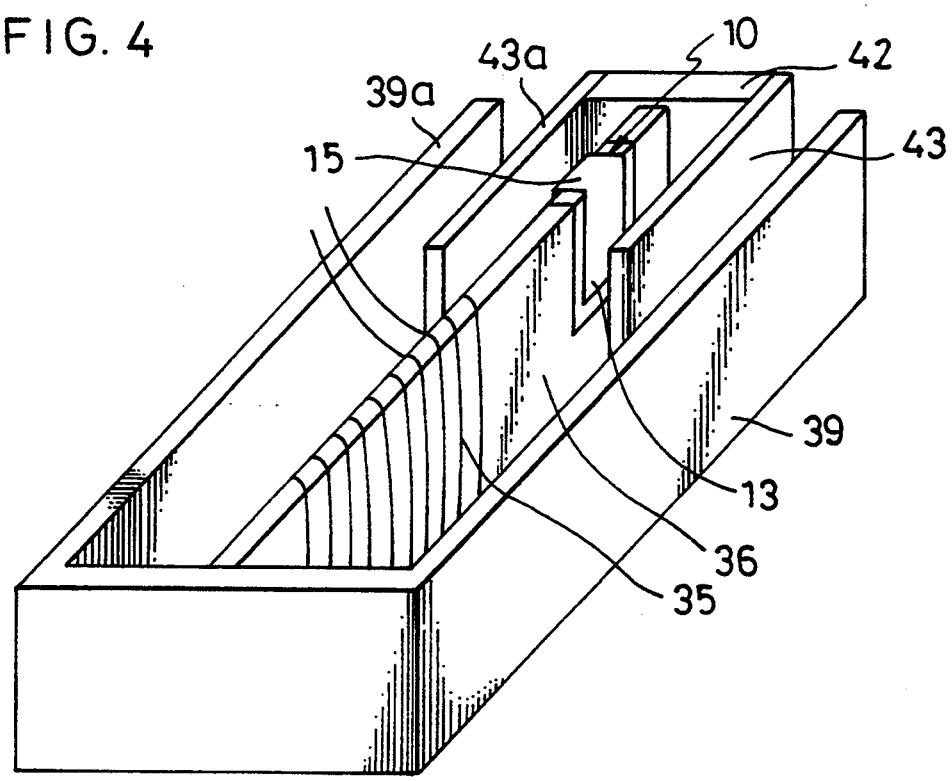
FIG. 4 shows in a fragmental perspective view as magnified stationary and movable members including the damper in the relay of FIG. 2.

Referring also to FIG. 4 showing somewhat exaggeratedly the above arrangement of the relay, the operation of the foregoing relay 20 shall be explained here. Now, as one directional electric current is made to flow through the coil 35 of the electromagnet device 32 in the relay 20, the armatures 43 and 43a made integral with the card 41 are attracted to the magnetic pole sections 39a of the yoke 37 on the side of the subsidiary contact means 24, the card 41 is thereby rotated toward the subsidiary contact means 24, and both of the main and subsidiary contact means 23 and 24 are opened. When on the other hand a reverse directional current is made to flow through the coil 35 of the electromagnet device 32, the armatures 43 and 43a integral with the card 41 are attracted towards the other magnetic pole section 39, the card 41 is thereby rocked to the side of the main contact means 23, and the main and subsidiary contact means 23 and 24 are eventually closed.

Figure 5:
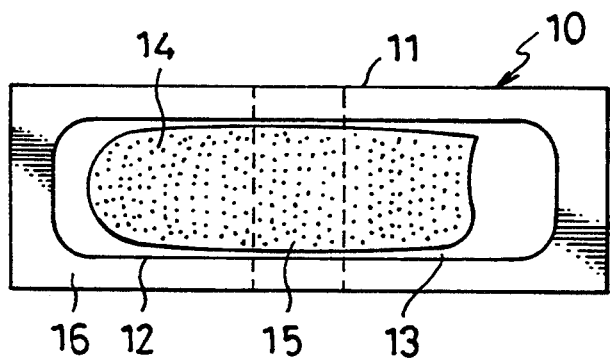
FIGS. 5 and 6 are explanatory views for the operation of the damper shown in FIG. 1.
Figure 4A:
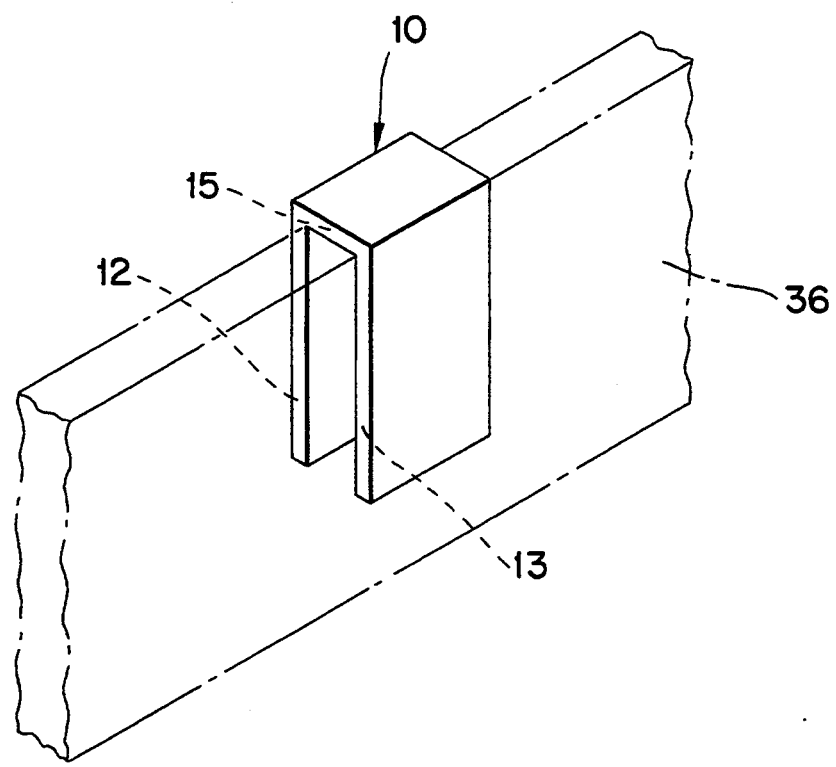
FIG. 4A is a fragmentary view of FIG. 4 showing a core thereof in phantom.

Upon such contact opening and closing operation of the main and subsidiary contact means 23 and 24, the armatures 43 and 43a at the rocking side end of the card 41 are caused to the other end of the stationary core 36 to generate the impinging noise or vibration, but, according to the present invention, the damper 10 carried on the other end side of the core 36 is capable of effectively restraining such impinging noise or the vibration, according to the present invention. Still more specifically, it is now assumed here that the card 41 is made to rock to attain such state as shown in FIG. 7 where one armature 43 has compressed the second chamber 13 of the damper 10, then substantially all of the fluids 14 is caused to flow through the communicating section 15 into the first chamber 12, as will be clear when FIG. 1 is also referred to. As the card 41 rocks again to start pressing the first chamber 12 in the damper 10 with the other armature 43a as shown in FIG. 8, the fluid 14 starts flowing into the second chamber 13 as shown in FIG. 5 and, when the other armature 43a has compressed substantially completely the first chamber 12 as shown in FIG. 9, substantially all of the fluid 14 is made to flow through the communicating section 15 into the second chamber 13 as also shown in FIG. 6.

Figure 6:
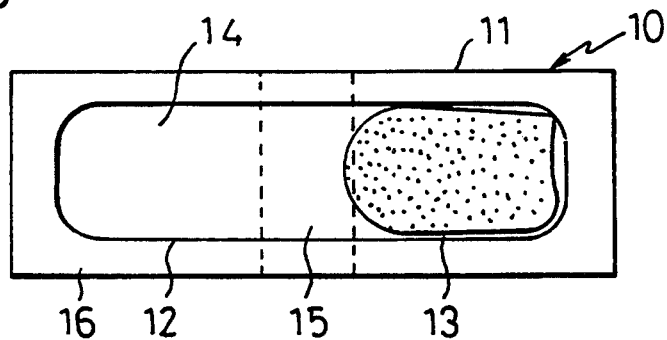
Figure 7:
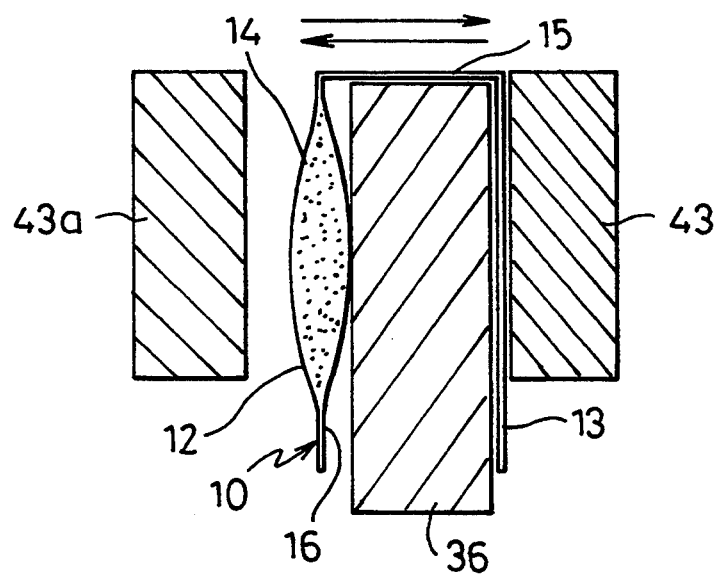
FIGS. 7 to 9 are schematic explanatory views for the operation of the damper of FIG. 1 when the same is applied to an electromagnet assembly.
Figure 8:
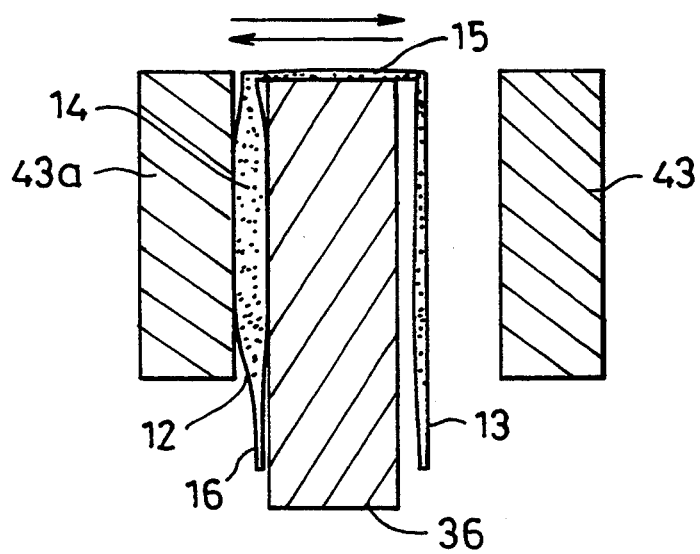
Figure 9:
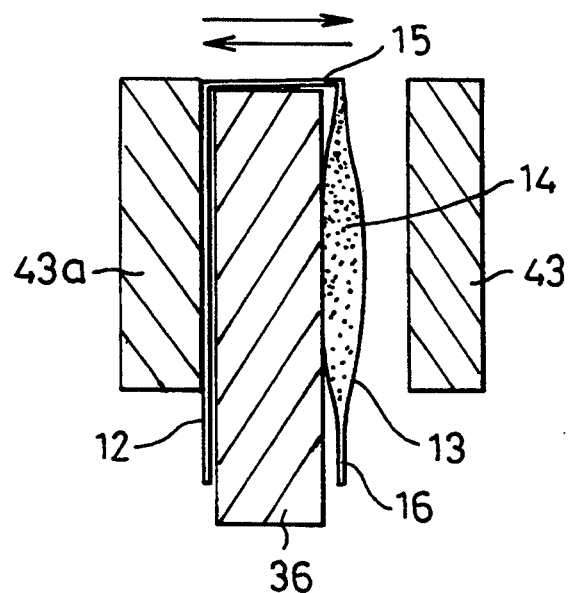

When on the other hand the card 41 again rocks and the other armature 43 starts compressing the second chamber 13 and continues until substantially the complete compression, that is, as the operation advances from the state of FIG. 9 to the state of FIG. 7, the operation is performed in reverse manner to the above, the state of FIG. 1 is reached from that of FIG. 6, and substantially all of the fluid 14 is made to flow from the second chamber 13 to the first chamber 12. It should be appreciated here that a non-load state is reached when both of the first and second chambers 12 and 13 are fully compressed.

With the foregoing operation of the damper 10, the device is provided with the buffer force corresponding to the flow rate of the fluid 14, until one of the armatures 43 and 43a compresses substantially completely a corresponding one of the second and first chambers 13 and 12, and the impinging speed and force of the armatures 43 and 43a with respect to the other end of the stationary core 36 can be remarkably reduced. Accordingly, the impinging noise and vibration generated in the operation of the electromagnet device 25 and eventually the relay 20, for example, can be effectively reduced and absorbed.

It will be appreciated, in this case, that the damper 10 constituted by the thin sheet members 11 with an amount of the fluid 14 sealed therein is simple in the structure and can be manufactured at low costs, while allowing the configuration to be freely selective and any sealing member not required.

Figure 10:
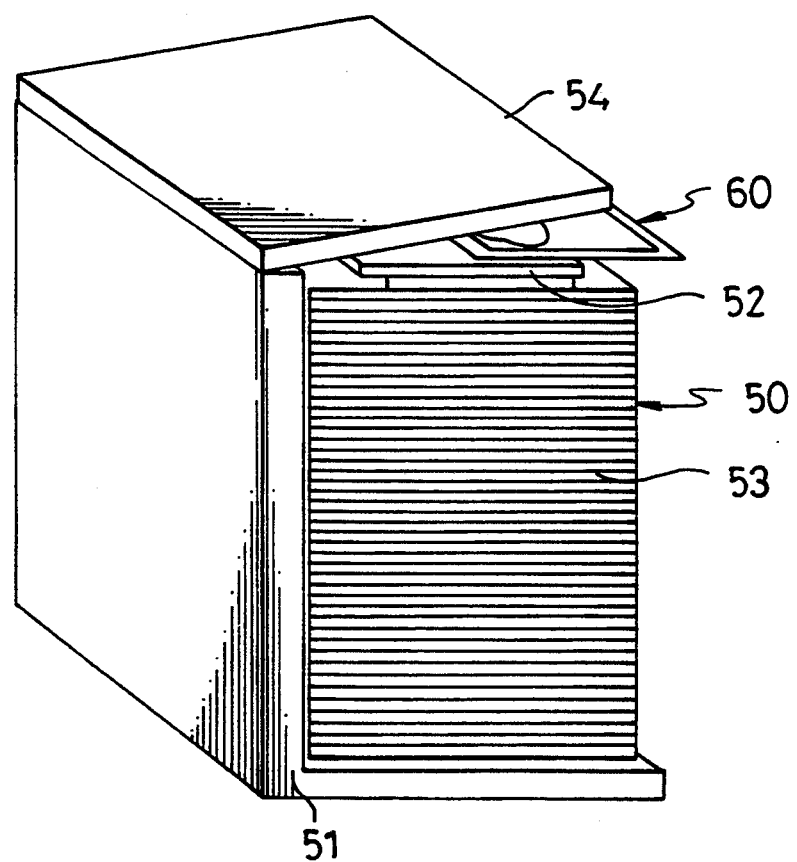
FIG. 10 shows in a fragmental perspective view as magnified another electrodeless relay employing a damper according to the present invention.
Figure 11:
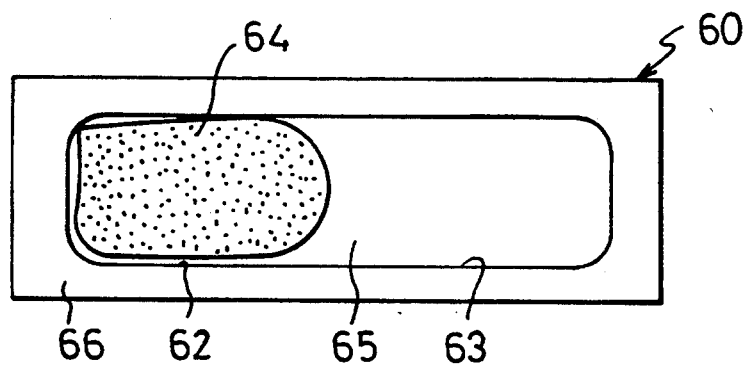
FIGS. 11 to 13 are explanatory views for the operation of the damper in the other embodiment as employed in the relay of FIG. 10.
Figure 14:
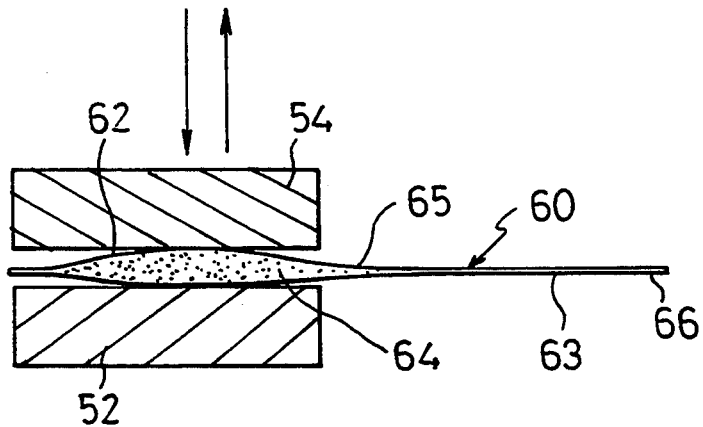
FIGS. 14 to 16 are schematic explanatory views for the operation of the damper in FIGS. 11–13 as employed in the electromagnetic assembly.

Referring next to FIG. 10, there is shown another embodiment in which the damper according to the present invention is employed in an electrodeless electromagnet device 50, which device comprises an L-shaped yoke 51, a core 52, a coil 53 placed on the L-shaped yoke 51, and an armature 54 pivotably supported on the top of the yoke 51 to engage with and disengage from top end of the core 52. In the present instance, the damper 60 is provided to the electrodeless electromagnet device 50 to dispose its first chamber 62 between the core 52 and the armature 54. Further, this damper 60 also formed with the sheet members 61 is to be so prepared that the second chamber 63 side is provided upon the molding with a constringing force effective to always close the second chamer 63 so long as no external force is given to the damper 60. That is, when no external force is applied, the damper 60 renders the fluid 64 to be held always in the first chamber 61, as shown in FIGS. 11 and 14.

Figure 12:
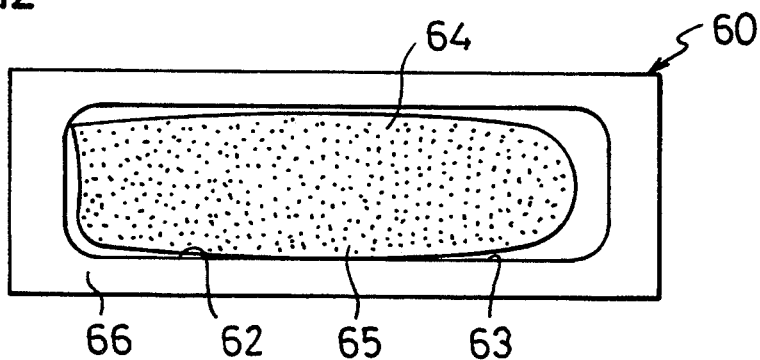
Figure 13:
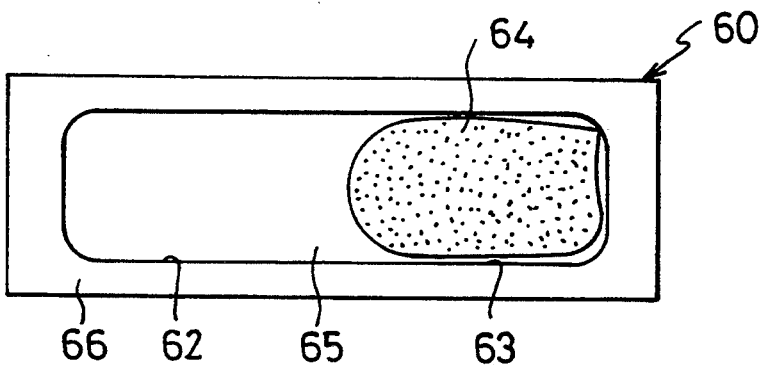
Figure 15:
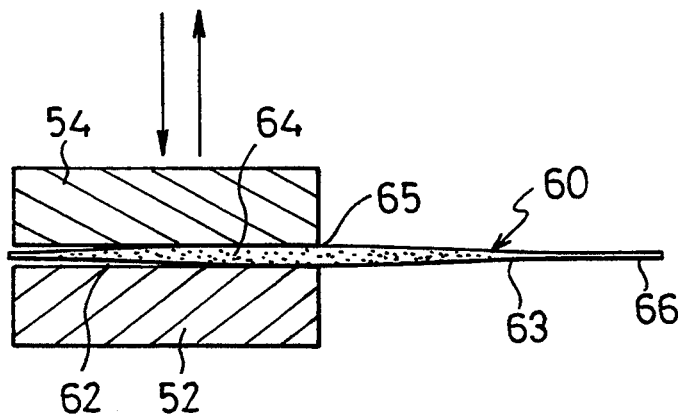
Figure 16:
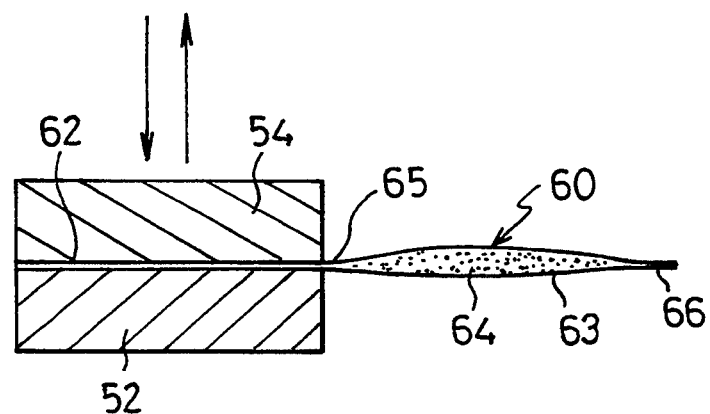

Accordingly, as a current is made to flow through the coil 53 and the armature 54 is attracted to the core 52, the armature depresses the damper 60, the fluid 64 retained within the first chamber 62 starts moving towards the second chamber 63 as seen in FIGS. 12 and 15 and, as the armature 54 reaches the closest position to the core 52, the fluid 64 is made to flow into the second chamber 63 substantially completely as seen in FIGS. 13 and 16. When the current flow to the coil 53 is interrupted, the armature 53 disengages from the core 52 to remove external force, the second chamber 63 is constringed, and the fluid 64 is restored to the first chamber 62, whereby the impinging speed and force upon the attraction of the armature 54 to the core 52 can be effectively reduced so as to realize the buffer action.

The arrangement of the damper 60 shown in FIGS. 11–16 is the same as that of the damper shown in FIGS. 1, 5 and 6, the same constituents in FIGS. 11–16 as those in FIGS. 1, 5 and 6 are denoted by the same reference numerals as those used in FIGS. 1, 5 and 6 but with "60" added, and the same function and effect can be attained with the damper 60.

Figure 17:
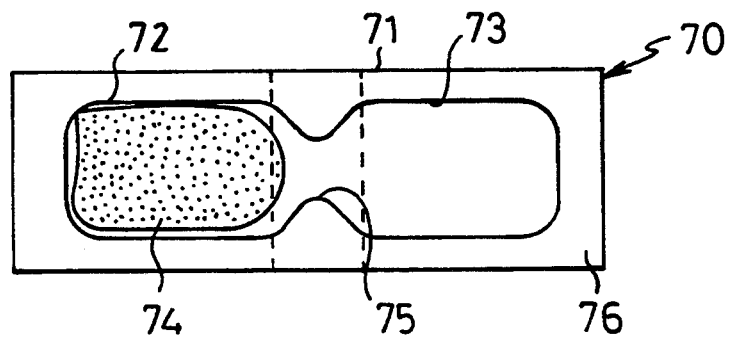
FIGS. 17 to 19 are explanatory views for the operation in another embodiment of the damper according to the present invention.
Figure 18:
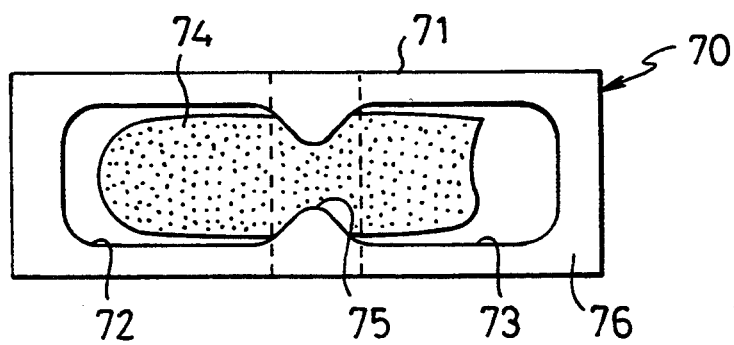
Figure 19:
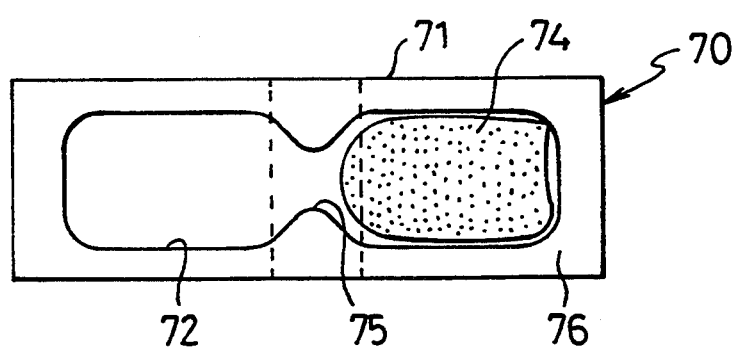
Figure 20:
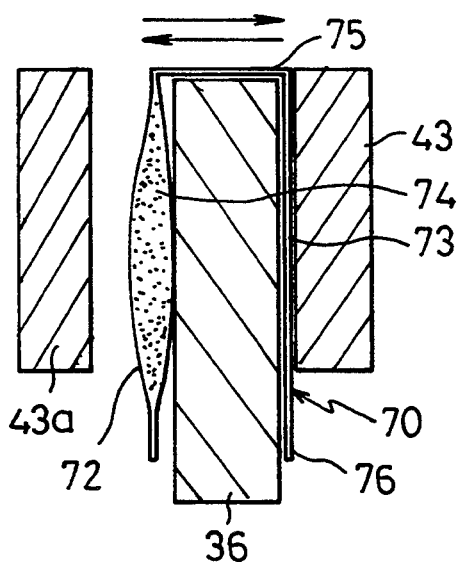
FIGS. 20 to 22 are schematic explanatory views for the operation of the damper in FIGS. 17 to 19 as employed in the electromagnet assembly.
Figure 21:
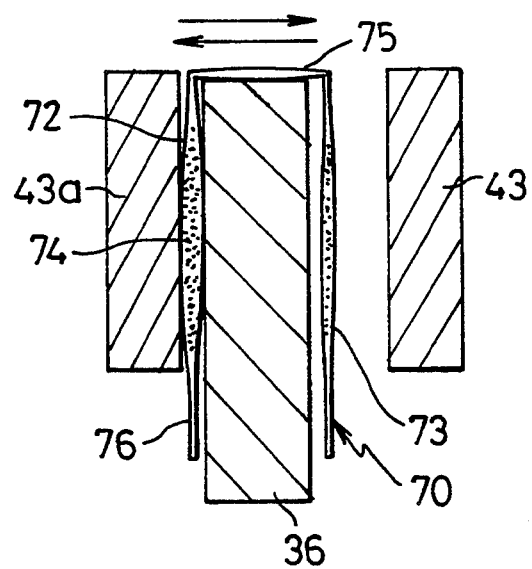
Figure 22:
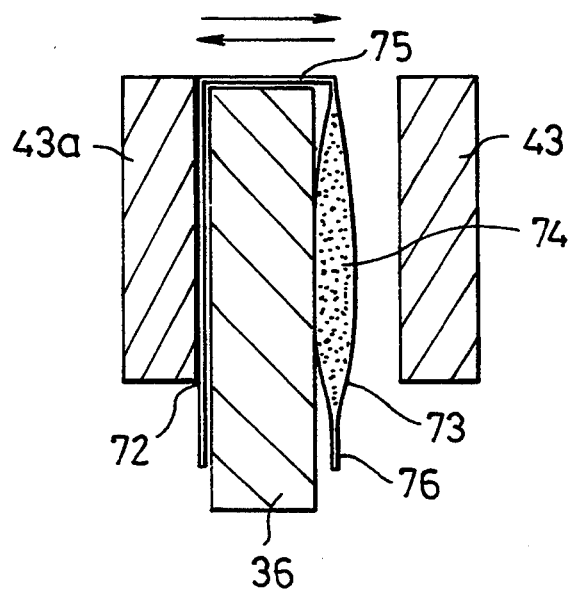
Figure 23:
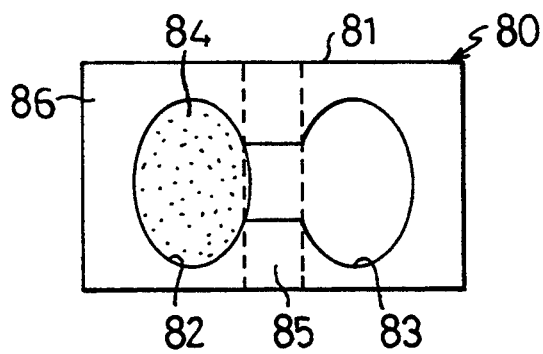
FIGS. 23 to 25 are explanatory views for the operation in another embodiment of the damper according to the present invention.
Figure 24:
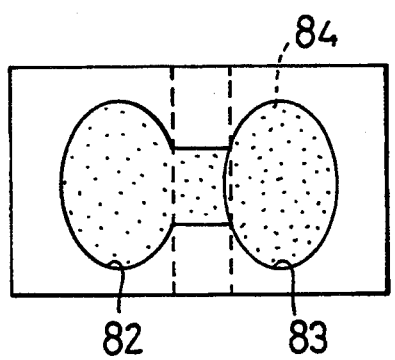
Figure 25:
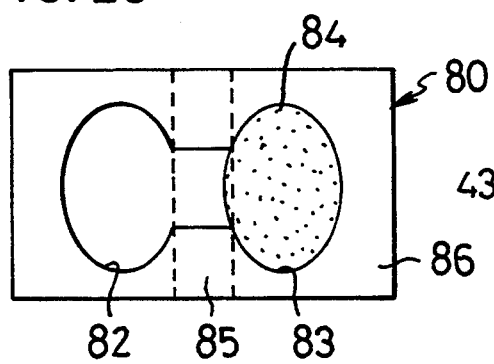
Figure 26:
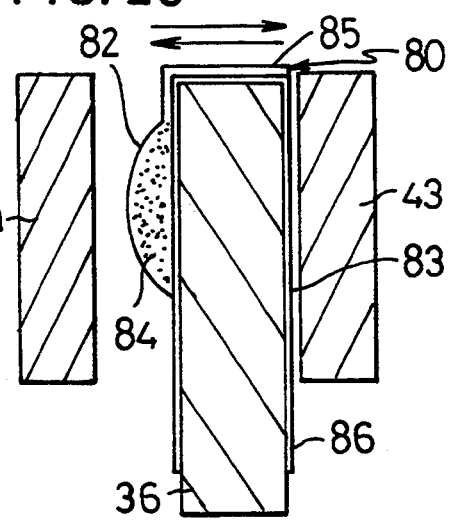
FIGS. 26 to 28 are schematic explanatory views for the operation of the damper in FIGS. 23-25 as employed in an electromagnet assembly.
Figure 27:
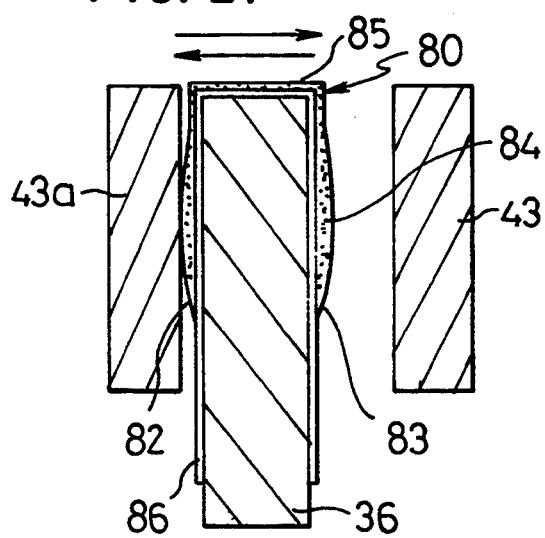
Figure 28:
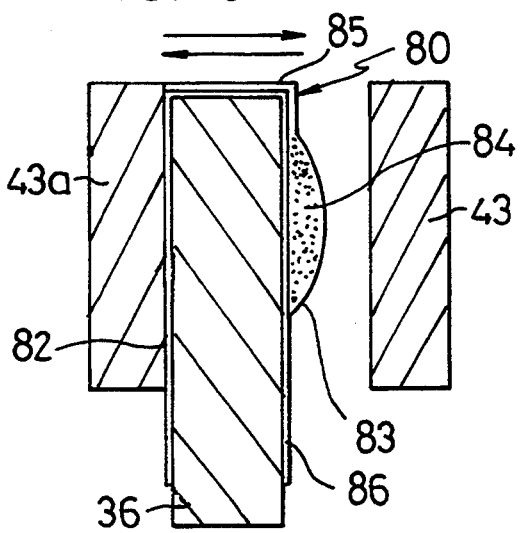

In FIGS. 17–19, there is shown another embodiment of the damper according to the present invention, in which damper 70 the communicating section 75 is formed with smaller width than the first and second chambers 72 and 73. As will be clear when FIGS. 20–22 are concurrently referred to, this narrower communicating section 75 provides to the fluid 74 an increased flow resistance when it passes therethrough due to the compression to the first or second chamber 72 or 73 including the fluid 74 by the armature 43 or 43a engaging with the stationary core 36, and the buffer action is thereby increased. With this arrangement, it is usefull to employ air, any one of various gases or any liquid of a low viscosity as the fluid 74.

The arrangement of the damper 70 shown in FIGS. 17–19 is the same as that in the damper 10 of FIGS. 1, 5 and 6, and the same constituents in the damper 70 as those in the damper 10 are denoted by the same reference numerals but with "70" added.

In another embodiment shown in FIGS. 23–28 of the present invention, the damper 80 is formed to have the first and second chambers 82 and 83 which can take a semi-dome shape when bulged with the fluid, while the communicating section 85 is provided narrower than the first and second chambers 82 and 83 but to be slightly thicker, so as to be three dimensional. In this instance, the first and second chambers 82 and 83 present the semi-dome shape when bulged but can be freely constricted as they are formed with two of the thin sheet-shaped webs stacked. With this arrangement of the present instance, the first and second chambers 82 and 83 as well as the communicating section 85 are three dimensional, so that the flow rate of the fluid contained therein can be easily designed.

Other arrangement of this damper shown in FIGS. 23–28 is the same as that in the damper 10 of the foregoing FIGS. 1, 5 and 6, and the same constituents as those in the embodiment of FIGS. 1, 5 and 6 are denoted by the same reference numerals as those used in FIGS. 1, 5 and 6 but with "70" added.

Figure 29:
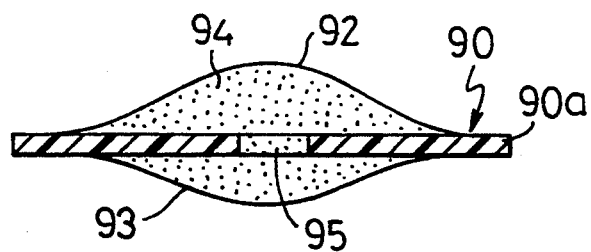
FIG. 29 shows in a schematic sectioned view still another embodiment of the damper according to the present invention.
Figure 30:
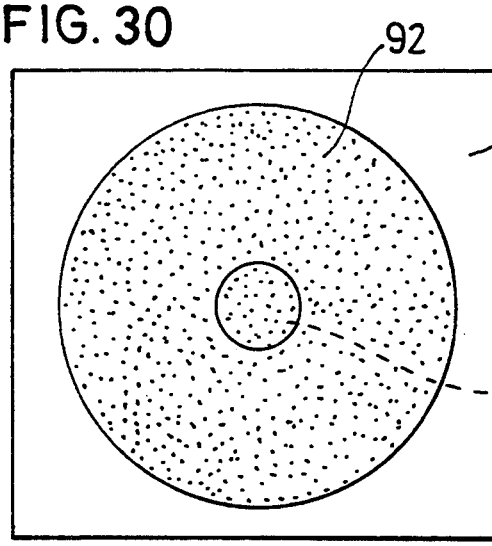
FIG. 30 is a plane view of the damper in FIG. 29.
Figure 31:
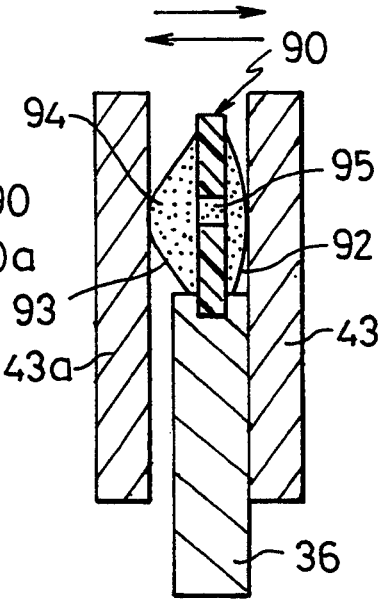
FIGS. 31 to 33 are schematic explanatory views for the operation of the damper shown in FIG. 29 as employed in the electromagnet assembly.
Figure 32:
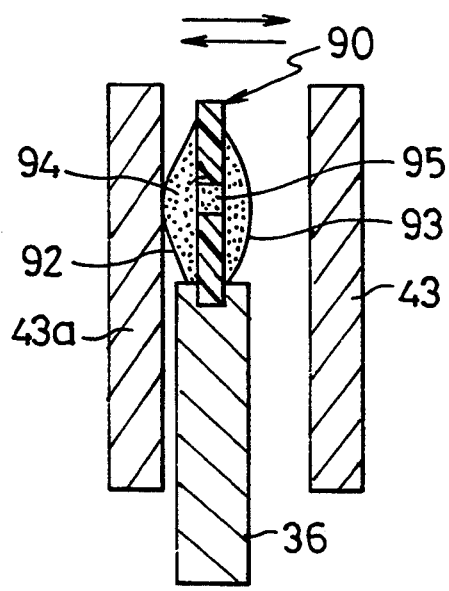
Figure 33:
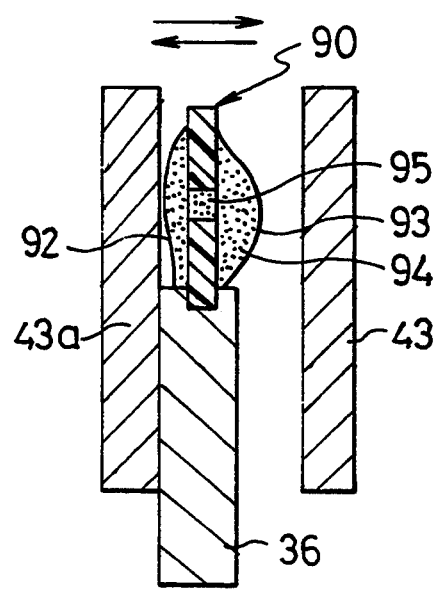

In FIGS. 29 and 30, there is shown still another embodiment of the present invention, in which the damper 90 comprises a centrally disposed partition 90a, two thin plastics sheets respectively adhered along circular peripheral edge to each surface of the partition 90a, to form the first chamber 92 on one side and the second chamber 93 on the other side of the partition 90a, while a through hole 95 is made as the communicating section substantially in the center of the partition 90a or of both of the chambers, and the fluid 94 is sealed in the chambers, preferably, in an amount exceeding the maximum volume of each chamber. In the present instance, as will be clear when FIGS. 31–33 are concurrently referred to, these first and second chambers 92 and 93 are disposed between the opposing armatures 43 and 43a with the thickness direction of the chambers aligned with separating direction of the armatures, so that the volume of one chamber with which one armature engage will be reduced but the other chamber is increased in the volume with the fluid caused to move through the hole 95, while the one chamber will not be completely compressed but enough to be separated from the one armature and the other chamber will gradually increase the volume to reach the maximum by the time when the other armature comes to engage therewith. Here, it is optimum to employ a PBT sheet of 1 mm thick as the partition 90a, and it is desirable to use fluoroplastic sheets as the sheet members for defining the first and second chambers 92 and 93.

In the present embodiment, the first and second chambers 92 and 93 can be made more easily settable in respect of the volume, and the flow rate of the fluid 94 can be optimumly set only by varying the diameter of the through hole made as the communicating section, so as to effectively buff the impinging speed and force of the armatures. Further, with the use of a contact lubricating oil, such as a FLOIL manufactured by a Japanese manufacturer YUSHI SEIHIN K.K., as the fluid 94 to be encapsulated in the chambers, it is made possible to effectively reduce any damage and wear of the plastic sheets defining the first and second chambers 92 and 93, and also to prevent any such contact trouble as poor couduction and so on from occurring even when the chambers are damaged to cause the fluid 94 to leak to be deposited on the main or subsidiary contact means. This contact lubricating oil may even be employed commonly in the foregoing embodiments of FIGS. 1, 5 and 6 and others.

Other arrangement of the damper 90 shown in FIGS. 29 and 30 is the same as that of the damper 10 shown in FIGS. 1, 5 and 6, and the same constituents as those in the embodiment of FIGS. 1, 5 and 6 are denoted by the same reference numerals as those employed in FIGS. 1, 5 and 6 but with "80" added.

In other embodiments of the damper according to the present invention, further, a magnetic fluid such as a FERRICOLLOID (trademark) of Japanese manufacturer TOHOKU KINZOKU KOGYO K.K. is employed as the damper fluid. More practically, the damper employing the magnetic fluid encapsulated can be effectively applied to such switch 100 as shown in FIG. 34, in which event the switch 100 comprises a casing 101 in which a magnet means 102 and a contact means 103 are disposed. in the contact means 103, a movable member is coupled to an armature 104 which is pivotably supported at an end to the casing 101 and is made engegeable with and disengageable from the magnet means 102. Between the magnet means 102 and the armature 104 the damper 110 which is similar in the arrangement to the damper 60 of FIGS. 11–16 but is not in the use of the magnetic fluid as the fluid.

As the armature 104 engages with or disengages from the magnet means 102, therefore, the magnetic fluid 114 flows between the first and second chambers 112 and 113 of the damper 110, upon which the fluid 114 being the magnetic fluid is influenced by the magnetic field generated by the magnet means 102 so that the magnetic fluid 114 will be charged either in the first chamber 112 or the second chamber 113 at a high density and the buffer force can be improved thereby effectively.

Other arrangement of the damper 110 shown in FIG. 34 is the same as that in the damper 10 shown in FIGS. 1, 5 and 6, and substantially the same constituents shown in FIG. 34 as those in FIGS. 1, 5 and 6 are denoted by the same reference numerals as those in FIGS. 1, 5 and 6 but with "100" added.

In another embodiment of the present invention shown in FIGS. 35 and 36, the damper 120 is provided in the partition 120a with a plurality of the through holes 125, five in the present instance, in contrast to the embodiment shown in FIGS. 29 and 30. In this case, the flow rate of the fluid between the first and second chambers 122 and 123 can be easily set by means of the number and diameter of the through holes 125.

In the damper 120 shown in FIGS. 35 and 36, other arrangement is the same as that in the foregoing damper 10 or 90 shown in FIGS. 1, 5 and 6 or in FIGS. 29 and 30, and substantially the same constituents in FIGS. 35 and 36 as those in FIGS. 1, 5 and 6 or in FIGS. 29 and 30 are denoted by the same reference numerals as those in FIGS. 1, 5 and 6 or in FIGS. 29 and 30 but with "110" or "30" added.

In further embodiments shown in FIGS. 37 and 38 and in FIGS. 39 and 40, the dampers 130 and 140 are formed to have the first and second chambers 132 and 133 in a three-stage dome shape and the first and second chamber 142 and 143 in a two-stage dome shape, respectively, in which respective stages of each chamber are made to mutually communicate. With this arrangement, it is made possible to realize the damper which is relatively long in the mechanical life.

Other arrangement of the damper 130 or 140 shown in FIGS. 37 and 38 or in FIGS. 39 and 40 is the same as that in the damper 10 or 90 shown in FIGS. 1, 5 and 6 or FIGS. 29 and 30, and substantially the same constituents in FIGS. 37 and 38 or FIGS. 39 and 40 as those in FIGS. 1, 5 and 6 or FIGS. 29 and 30 are denoted by the same reference numerals as those in FIGS. 1, 5 and 6 or FIGS. 29 and 30 but with "120" and "40" or "130" and "50" added.

In another embodiment shown in FIG. 41, the damper 150 is formed with a polyamide resin preferably in the entirety of the damper 150 in contrast to the embodiment shown in FIGS. 29 and 30. The first chamber 152 and the partition 150a, the second chamber 153 and the partition 150a are bounded together preferably by means of ultrasonic welding. In still another embodiment shown in FIG. 42, the damper 160 is formed by securing the first and second chambers 162 and 163 made of a fluororubber to both surfaces of the partition 160a made of a plastics, preferably through a holding member, so that the chamber-forming sheet member itself will be provided with an elasticity and the buffer ability can be increased.

Other arrangement of the damper 150 or 160 shown in FIG. 41 or 42 is the same as that in the damper 10 or 90 shown in FIGS. 1, 5 and 6 or FIGS. 29 and 30, and substantially the same constituents as those in the damper 10 or 90 are denoted in FIG. 41 or 42 by the same reference numerals as those in FIGS. 1, 5 and 6 or FIGS. 29 and 30 but with "140" and "60" or "150" and "70" added.

Figure 43:
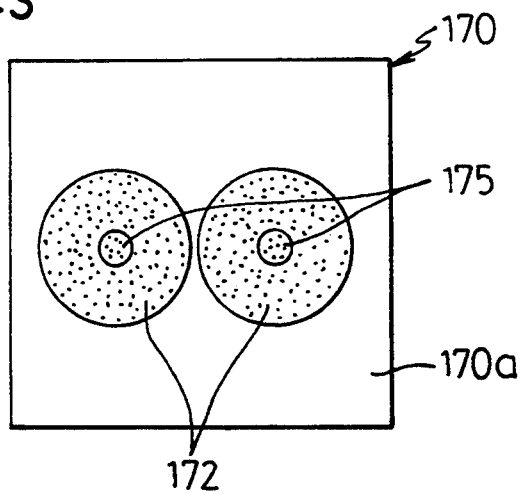
FIG. 43 shows in plane view a damper in another embodiment according to the present invention.
Figure 44:
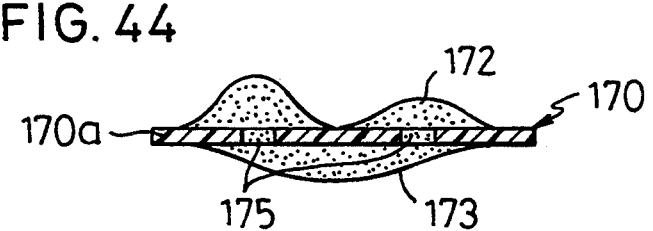
FIG. 44 is a sectioned view of the damper in FIG. 43.
Figure 45:
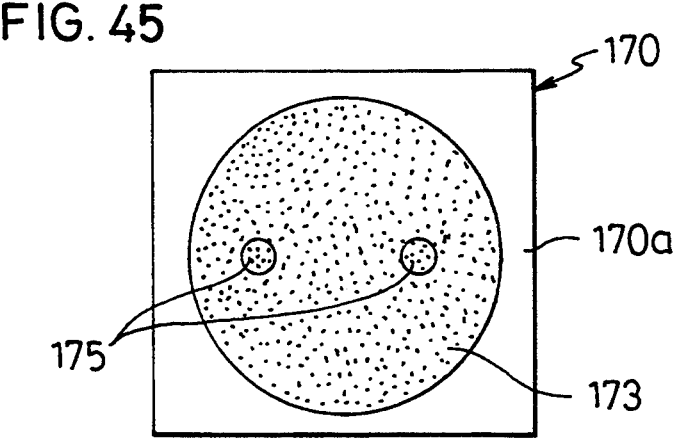
FIG. 45 is a bottom view of the damper of FIG. 43.
Figure 46A:
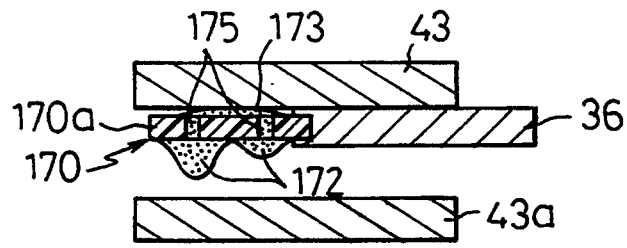
FIGS. 46a through 46e are explanatory views for the operation of the damper of FIG. 43.
Figure 46B:
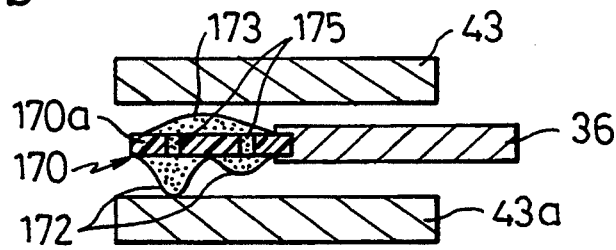
Figure 46C:
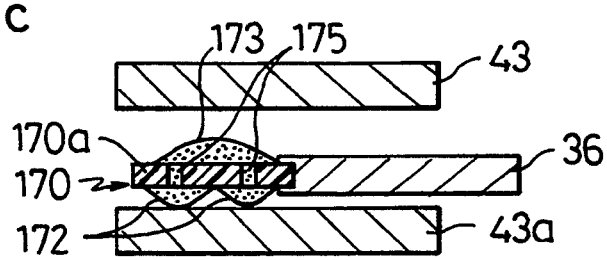
Figure 46D:
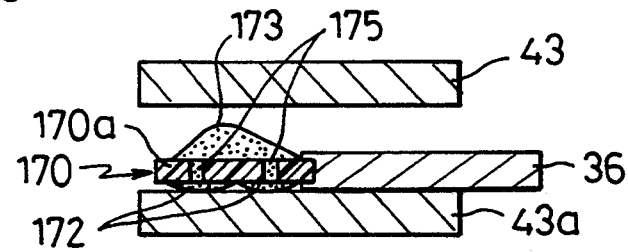
Figure 46E:
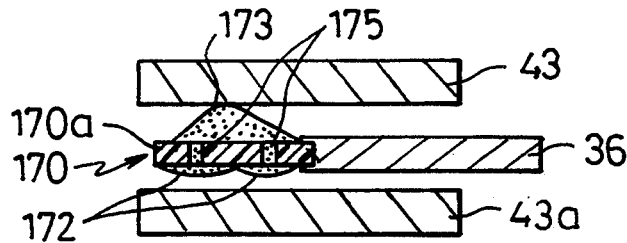

In FIGS. 43–45, there is shown a further embodiment of the present invention, in which the damper 170 comprises two of the first chambers 172 made on one surface of the partition 170a with mutually different height, the single second chamber 173 made on the other surface of the partition 170a, and two of the through holes 175 as the communicating section made in the partition 170a between each of the two first chambers 172 and the second chamber 173. When this damper 170 is employed in such relay as shown in FIGS. 2 and 3 and so long as the contacts in the contact means are in open state, the single second chamber 173 is depressed by one armature 43 whereas the two first chambers 172 are released from the other armature 43a, as shown in FIG. 46a. Next, as the card 41 rocks to render the contact means to be in a state immediately before closed state of the contacts, the other armature 43a is brought into engagement with higher one of the two first chambers 172, as shown in FIG. 46b. As the card 41 further rocks, then the higher one of the first chambers 172 is depressed by the other armature 43a as shown in FIG. 46c and, then, both of the two first chambers 172 are concurrently depressed by the other armature 43a as shown in FIG. 46d. When the card 41 rocks in reverse direction, then the first two chambers 172 are released from the other armature 43a while the one armature 43 is brought into engagement with the single second chamber 73 as shown in FIG. 46e, through which state the contact open state of FIG. 46a with the second chamber 173 compressed by the one armature 43 is restored. With this arrangement, the compression of the two first chambers 172 is performed through two stages, and it is made possible to obtain the buffer effect which increases stepwise.

Other arrangement of the damper 170 shown in FIGS. 43–46 is the same as that in the damper 10 or 90 shown in FIGS. 1, 5 and 6 or FIGS. 29 and 30, and substantially the same constituents as those in the damper 10 or 90 are denoted in FIGS. 43–36 by the same reference numerals as those in FIGS. 1, 5 and 6 or FIGS. 29 and 30 but with "160" or "70" added.

Figure 47:
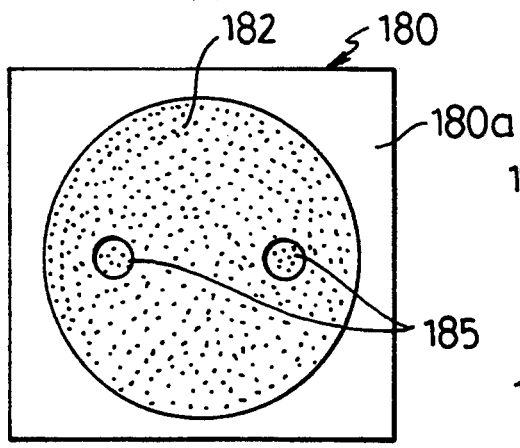
FIG. 47 shows in a plane view a damper of another embodiment according to the present invention.
Figure 48:
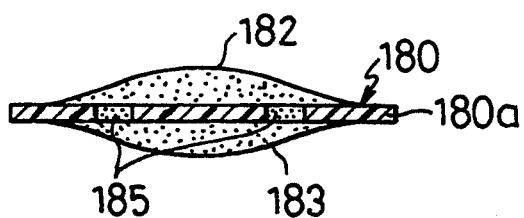
FIG. 48 is a sectioned view of the damper in FIG. 47.
Figure 49:
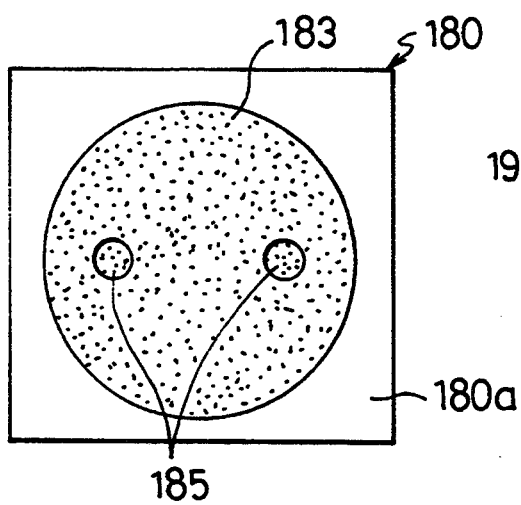
FIG. 49 is a bottom view of the damper of FIG. 47.

In FIGS. 47–49, there is shown another embodiment in which the damper 180 is provided in the partition 180a with two of the through holes 185 as the communicating section between the first and second chambers 182 and 183 on both sides of the partition 180a, in contrast to the embodiment shown in FIGS. 29 and 30, whereby the flow rate of the fluid 184 between the first and second chambers and eventually the impinging speed and force of the armatures with respect to the stationary core can be easily set.

Other arrangement of the damper 180 shown in FIGS. 47–49 is the same as that in the damper 10 or 90 shown in FIGS. 1, 5 and 6 or FIGS. 29 and 30, and substantially the same constituents as those in the damper 10 or 90 are denoted in FIGS. 47–49 by the same reference numerals as those in FIGS. 1, 5 and 6 or FIGS. 29 and 30 but with "170" or "90" added.

Figure 50:
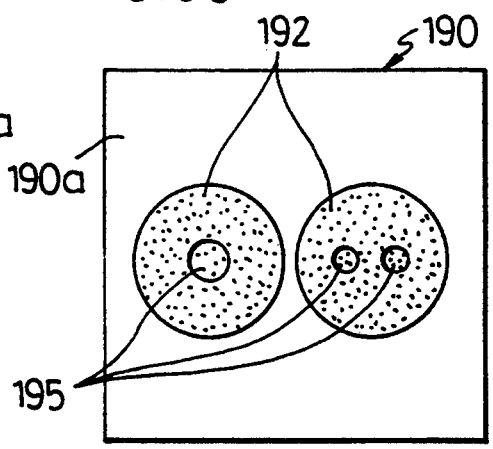
FIG. 50 shows in a plane view a damper in yet another embodiment according to the present invention.
Figure 51:
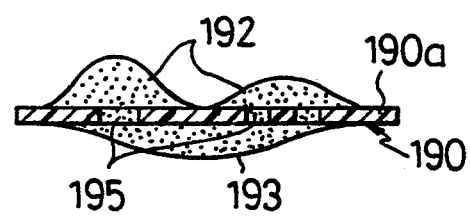
FIG. 51 is a sectioned view of the damper of FIG. 50.
Figure 52:
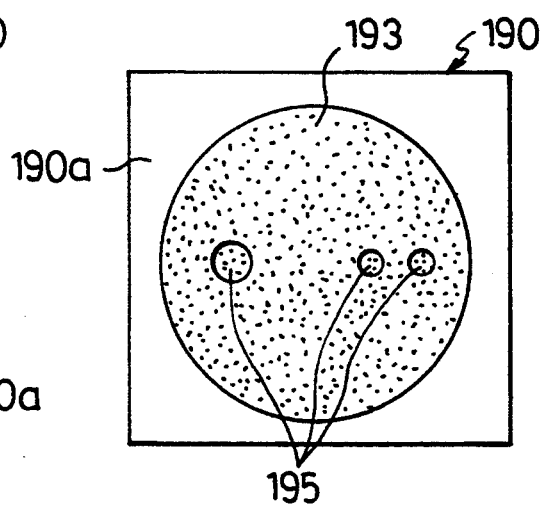
FIG. 52 is a bottom view of the damper of FIG. 50.

In another embodiment shown in FIGS. 50–52, the damper 190 having the two first chambers 192 different in the height is provided in the partition 190a with two through holes 195 between smaller one of the two first chambers 192 and the single second chamber 193, and one through hole 195 between taller one of the two first chambers 192 and the single second chamber 193 so that the flow rate of the fluid 194 between the first and second chambers 192 and 193 and eventually the impinging speed and force of the armatures with respect to the stationary core can be easily set.

Other arrangement of the damper 190 shown in FIGS. 50–52 is the same as that in the foregoing damper 10, 90 or 170 shown in FIGS. 1, 5 and 6, FIGS. 29 and 30 or FIGS. 43–46, and substantially the same constituents as those in the damper 10, 90 or 170 are denoted in FIGS. 43–46 by the same reference numerals as those in FIGS. 1, 5 and 6, FIGS. 29 and 30 or FIGS. 43–46 but with "180", "100" or "20" added.

Figure 53:
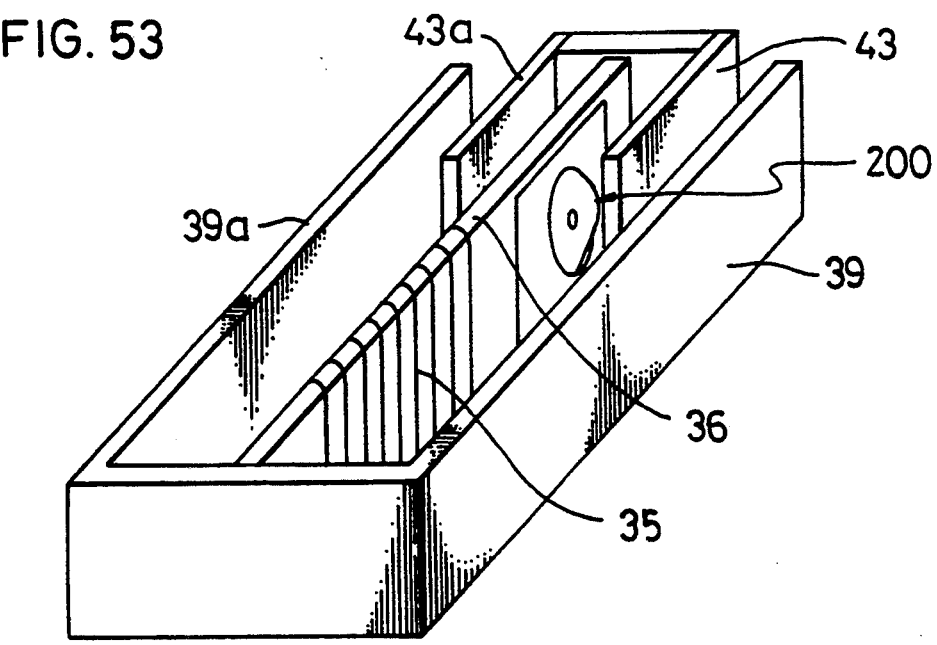
FIG. 53 is a fragmentary perspective view of movable and stationary members including a damper in another embodiment according to the present invention in a relay in which the damper is employed.
Figure 54A:
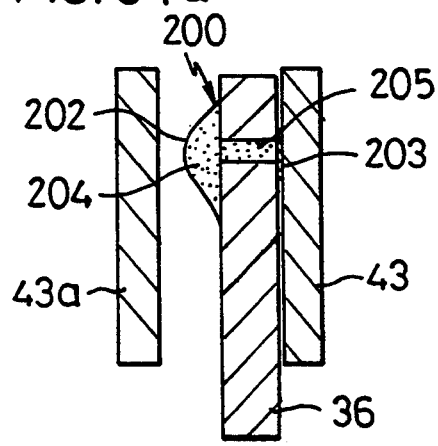
FIGS. 54a through 54d are explanatory views for the operation of the damper of FIG. 53 as employed in the relay.
Figure 54B:
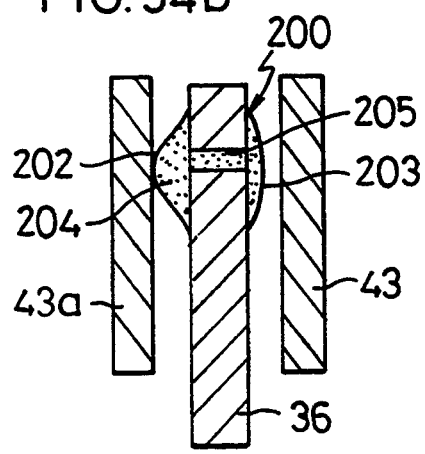
Figure 54C:
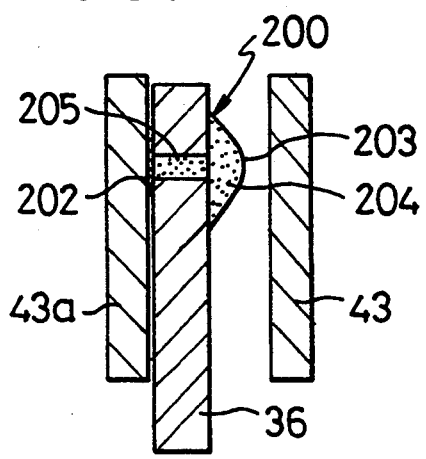
Figure 54D:
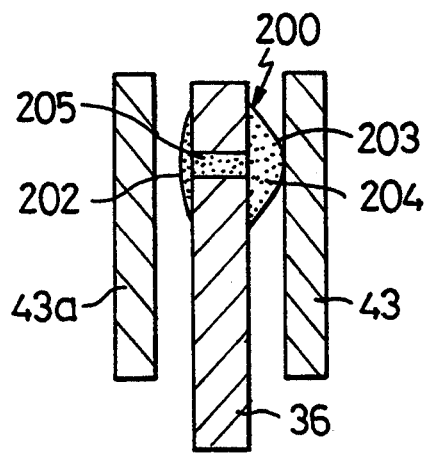

In another embodiment shown in FIGS. 53 and 54, the damper 200 is incorporated directly in the other end part of the stationary core 36, in contrast to the embodiment shown in FIGS. 29 and 30. In this case, the damper 200 is formed by providing the through hole 205 in the stationary core 36 and securing the first and second chambers 202 and 203 to both sides of the through hole 205 of the core 36, so that an arrangement capable of effective relieving the impinging speed and force of the armatures 43 and 43a with respect to the stationary core 36 upon the rocking motion of the card can be realized, without giving any influence at all to the assembling ability of the remote controllable relay.

Other arrangement of the damper 200 shown in FIGS. 53 and 54 is the same as that in the foregoing damper 10 or 90 shown in FIGS. 1, 5 and 6 or FIGS. 29 and 30, and substantially the same constituents as those in the damper 10 or 90 are denoted in FIGS. 53 and 54 by the same reference numerals as those in FIGS. 1, 5 and 6 or FIGS. 29 and 30 but with "190" or "110" added.

Figure 55:
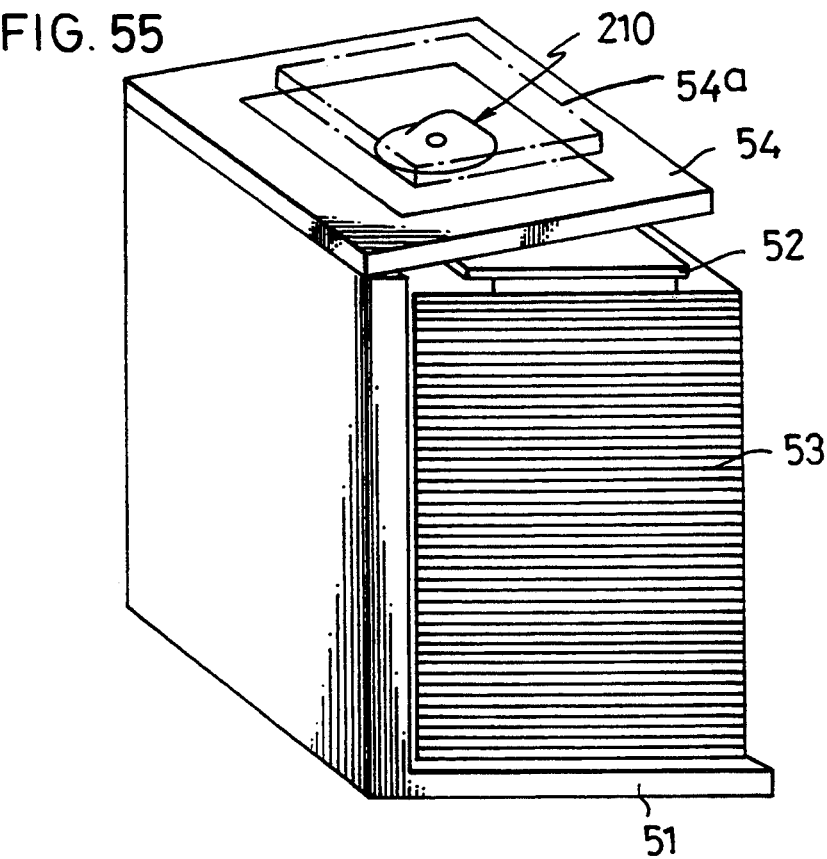
FIG. 55 is a fragmentary perspective view as magnified of another electrodeless relay in which the damper according to the present invention is employed.
Figure 56A:
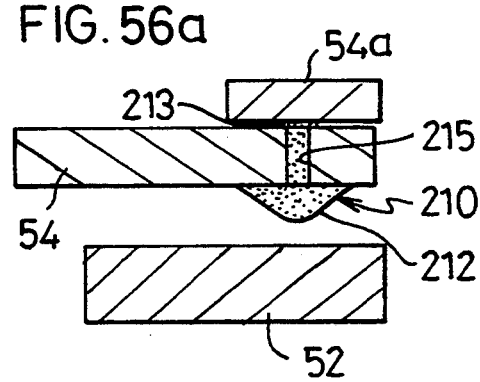
FIGS. 56a through 56d are explanatory views for the operation of the damper employed in the relay of FIG. 55.
Figure 56B:
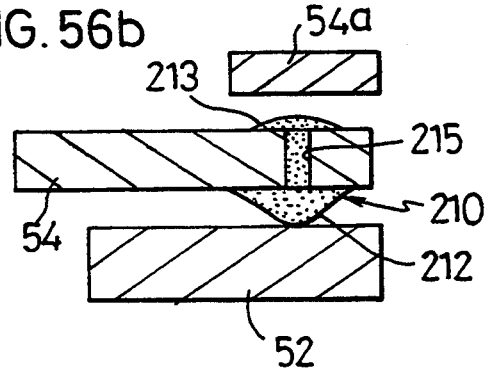
Figure 56C:
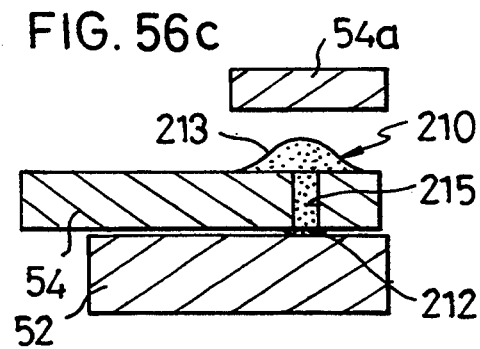
Figure 56D:
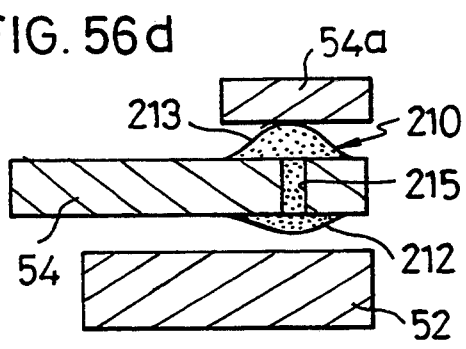

In another embodiment shown in FIGS. 55 and 56, the damper 210 is provided as incorporated directly in the armature 54 of the electrodeless electromagnet device, in contrast to the foregoing embodiment of FIG. 10, in which instance the damper 210 is formed by making the through hole 215 in the armature 54 and securing the first and second chambers 212 and 213 to both sides of the through hole 215 of the armature 54, that is, with the armature 54 utilized also as the partition, and a stopper 54a is provided above the armature 54 for limiting its upward motion, whereby the impinging speed and force of the armature 54 with respect to the core 52 upon attraction of the armature 54 can be effectively relieved, without giving any influence upon the assembling ability of the electrodeless electromagnet device. While in the foregoing relay the armature on the side of not engaging with the damper upon rocking of the card may act also as a stopper which restricts any excessive rocking of the card, the excessive upward motion of the armature 54 is to be effectively restricted by the stopper 54a.

Other arrangement of the damper 210 shown in FIGS. 55 and 56 is the same as that in the damper 10 or 60 shown in FIGS. 1, 5 and 6 or FIG. 10, and substantially the same constituents as those in the damper 10 or 60 are denoted in FIGS. 55 and 56 by the same reference numerals as those in FIGS. 1, 5 and 6 or in FIG. 10 but with "200" or "150" added.

Figure 57:
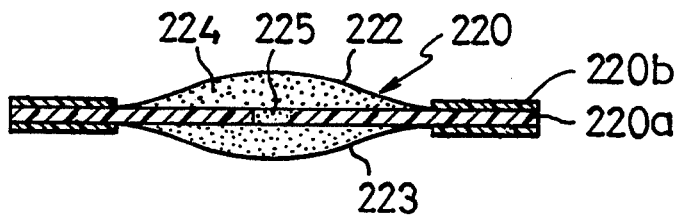
FIG. 57 shows in a sectioned view in another embodiment of the damper according to the present invention.
Figure 58:
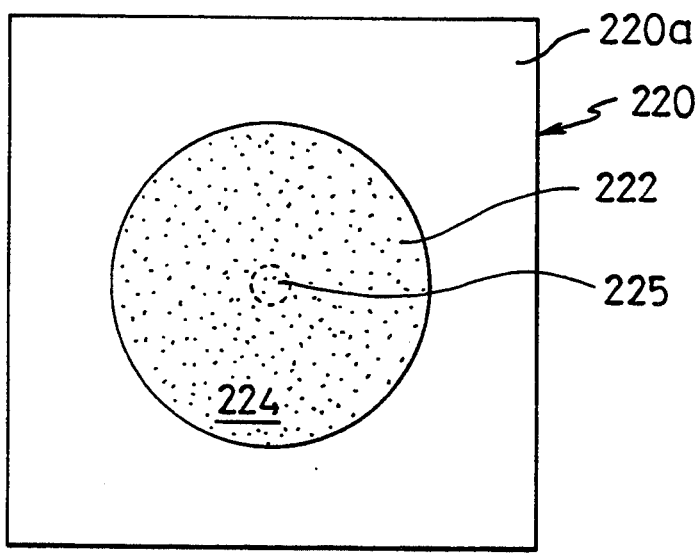
FIG. 58 is a plane view of the damper of FIG. 57.
Figure 59:
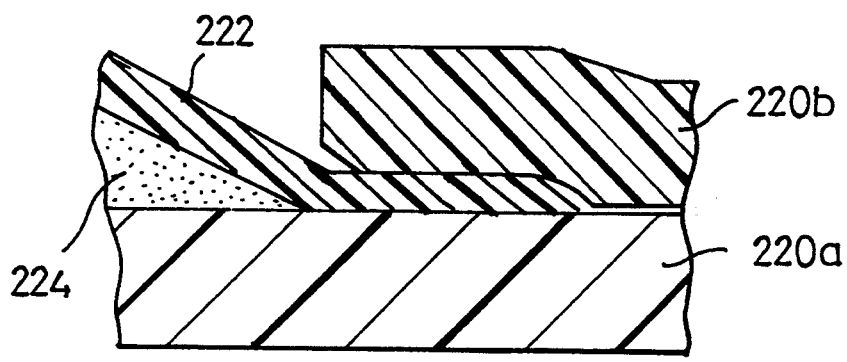
FIG. 59 is a fragmentary sectioned view as magnified of the damper of FIG. 57.
Figure 63:
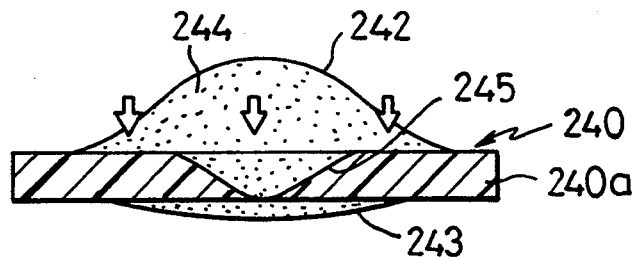
FIG. 63 shows in a sectioned view of a damper in another embodiment according to the present invention.
Figure 64:
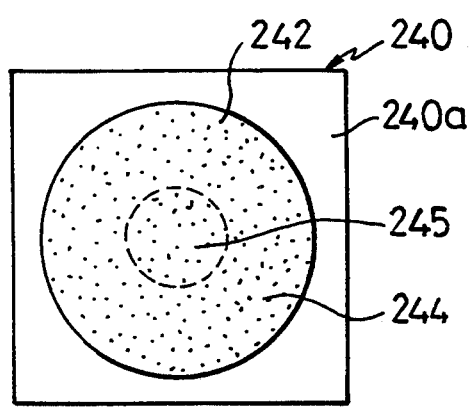
FIG. 64 is a plane view of the damper in FIG. 63.
Figure 65:
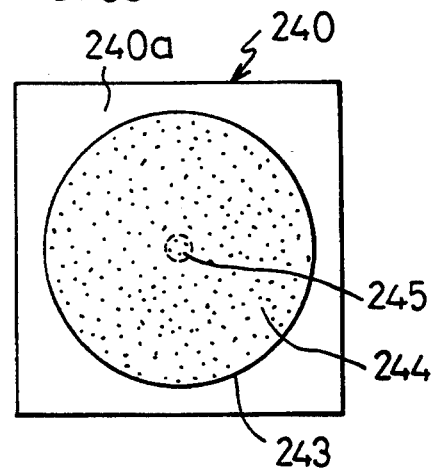
FIG. 65 is a bottom view of the damper of FIG. 63.
Figure 66A:
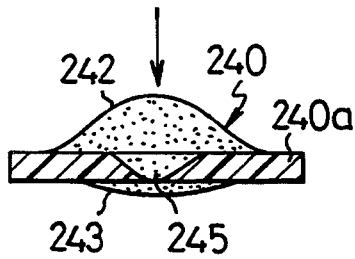
FIGS. 66a through 66d are explanatory views for the operation of the damper in FIG. 63.
Figure 66B:
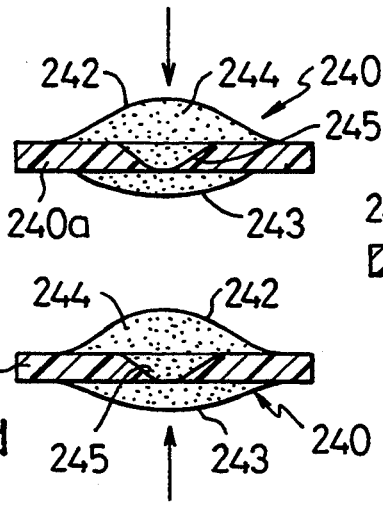
Figure 66C:
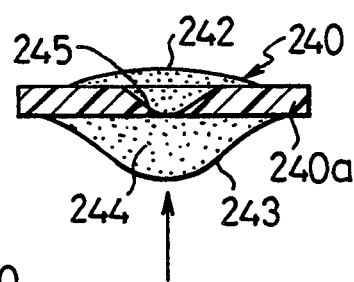
Figure 66D:
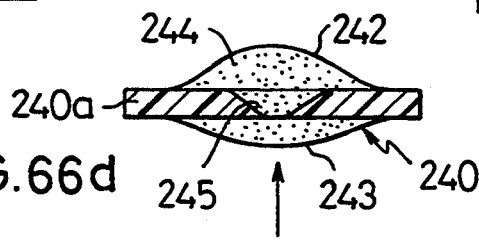

In another embodiment shown in FIGS. 57–59, the damper 220 employs substantially square-shaped sheet members of polyamide resin for defining the first and second chambers 222 and 223, and is provided on both surfaces of the partition 220a and peripherally around the chambers with holding members 220b of the same polyamide resin, the partition 220a and holding members 220b being bonded together preferably by means of ultrasonic welding, with the sheet members held between them, whereby the first and second chambers 222 and 223 are improved in the sealing property and also in the durability.

Other arrangement of the damper 220 shown in FIGS. 57–59 is the same as that in the foregoing damper 10 or 90 of FIGS. 1, 5 and 6 or FIGS. 29 and 30, and substantially the same constituents as those in the damper 10 or 90 are denoted in FIGS. 57–59 by the same reference numerals as those in FIGS. 1, 5 and 6 or FIGS. 29 and 30 but with "210" or "130" added.

In still another embodiment shown in FIGS. 60–62, the damper 230 comprises two partitions 230a and 230b respectively having each of the through holes 235 and 235a substantially in the center and also each of the first and second chambers 232 and 233 which are separately secured on the respective partitions 230a and 230b on their one surface, which partitions being joined with the other surfaces butted while aligning the through holes 235 and 235a for the communication between both chambers. More specifically, a pair of the sheet members of polyamide resin, preferably, are stacked while defining between them each of the first and second chambers 232 and 233 with the fluid 234 encapsulated therein, as shown in FIG. 62a, then the sheet members having the fluid in the chambers 232 and 233 are secured respectively on one surface of each of the partitions 230a and 230b preferably of the polyamide resin with the through holes 235 and 235a disposed in the center of the chambers, as shown in FIG. 62b. Then the partitions 230a and 230b carrying the first and second chambers 232 and 233 are placed in a vacuum vessel 230A, as shown in FIG. 62c, and are joined together with the open side of the through holes 235 and 235a disposed face to face as aligned and air-tightly by means of the ultrasonic welding within the vacuumed atmosphere and the damper 230 of the present embodiment as shown in FIG. 62d is completed. In this case, the ultrasonic welding in the vacuumed atmosphere is effective to smoothly and sufficiently join the constituents even when the partitions are provided in the stacked state.

Other arrangement of the damper 230 shown in FIGS. 60–62 is the same as that in the damper 10 or 90 of FIGS. 1, 5 and 6 or FIGS. 29 and 30, and substantially the same constituents as those in the damper 10 or 90 are denoted in FIGS. 60–62 by the same reference numerals as those in FIGS. 1, 5 and 6 or FIGS. 29 and 30 but with "220" or "140" added.

In a further embodiment shown in FIGS. 63–66, the damper 240 is featured in that the through hole 245 made through the partition 240a as the communicating section between the first and second chambers 242 and 243 provided on both sides of the partition is formed substantially in a conic shape with an opening diameter on the upper first chamber 242 side to be larger while the diameter is gradually reduced toward the other side to be remarkably constricted on the lower second chamber 243 side. Consequently, the fluid flowing speed from the first chamber 242 through the hole 245 to the second chamber 243 as shown by an arrow in FIGS. 66a and 66b is made different from the speed from the second chamber 243 through the hole 245 to the first chamber 242 as shown by an arrow in FIGS. 66c and 66d. That is, assuming here that the first chamber 242 is being depressed, there will occur a composite flow of the fluid within the first chamber 242 of a direct flow from the larger diametered opening through the constricted opening into the second chamber 243, and of an indirect flow which once impinge flat surface of the partition 240a around the large opening and then directed through the hole 245 into the second chamber 243, so that a larger amount of the fluid has to be directed to the constricted opening and it will take a longer time until desired buffer effect starts occurring or, in other words, the buffer effect is made shorter. Accordingly, this arrangement will be advantageous when it is intended to delay the card rocking in one direction relative to the other directional rocking in the electromagnet device or the relay.

Other arrangement of the damper 240 shown in FIGS. 63–66 is the same as that in the foregoing damper 10 or 90 shown in FIGS. 1, 5 and 6 or in FIGS. 29 and 30, and substantially the same constituents as those in the damper 10 or 90 are denoted in FIGS. 63–66 with the same reference numerals as those in FIGS. 1, 5 and 6 or in FIGS. 29 and 30 but with "230" or "150" added.

In a further embodiment shown in FIGS. 67–70, the damper 250 is provided in the partition 250a with a slanted through hole 255 opened at one end on the side of the first chamber 252 substantially to be in the center and at the other end on the side of the second chamber 253 to be at a peripheral portion of the chamber, as being thus slanted downwardly outward. In this case, the flow amount of the direct flow of the fluid 254 from the side of the first chamber 252 in which the hole 255 is centrally opened becomes larger (FIGS. 70a and 70b) so as to require a longer time for enabling the buffer effect to occur, and a function similar to that in the damper 240 of the above embodiment (as in FIG. 66) can be obtained.

Other arrangement of the damper 250 shown in FIGS. 67–70 is the same as that in the damper 10 or 90 shown in FIGS. 1, 5 and 6 or FIGS. 29 and 30, and substantially the same constituents as those in the damper 10 or 90 are denoted in FIGS. 67–70 by the same reference numerals as those in FIGS. 1, 5 and 6 or FIGS. 29 and 30 but with "240" or "160" added.

Figure 75:
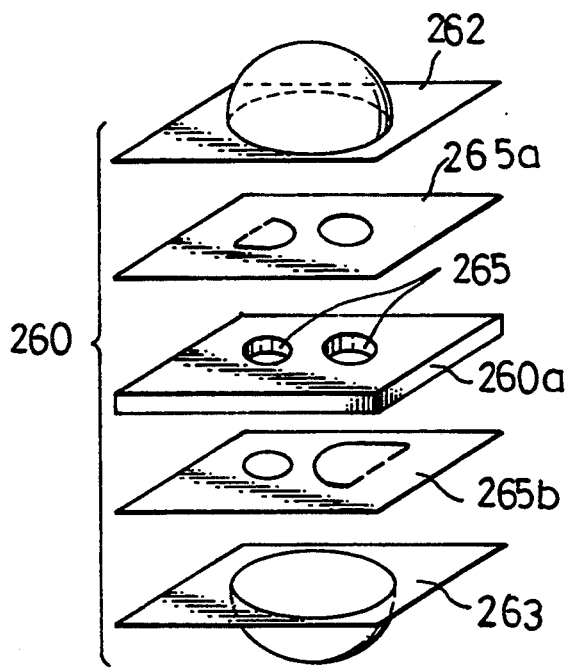
FIG. 75 shows in a perspective view as disassembled of a damper in another embodiment according to the present invention.
Figure 76:
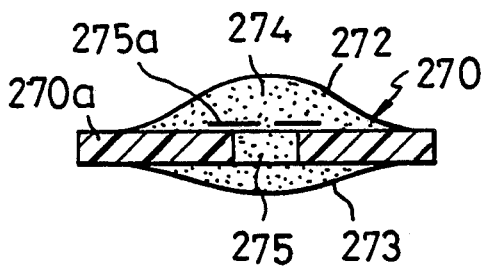
FIG. 76 shows in a sectioned view a damper in another embodiment of the present invention.
Figure 77:
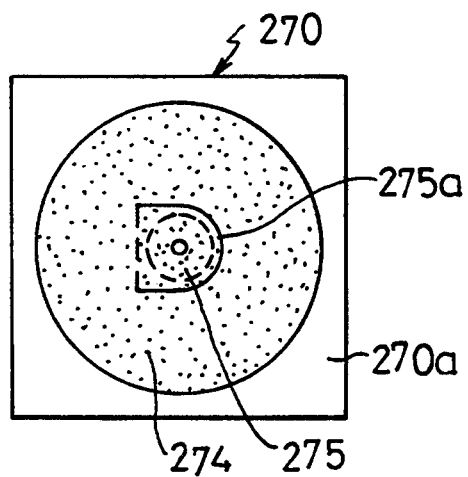
FIG. 77 is a plane view of the damper of FIG. 76.
Figure 78:
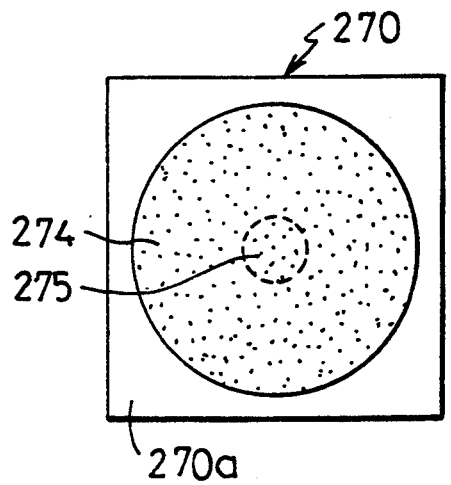
FIG. 78 is a bottom view of the damper of FIG. 76.
Figure 79A:
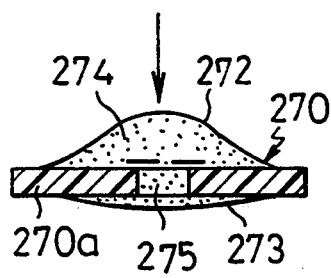
FIGS. 79a through 79d are explanatory views for the operation of the damper of FIG. 76.
Figure 79B:
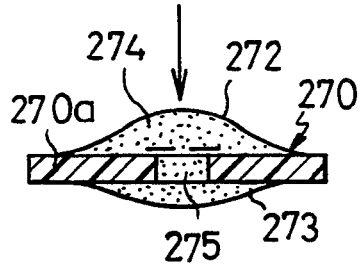
Figure 79C:
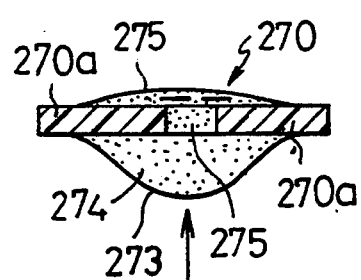
Figure 79D:
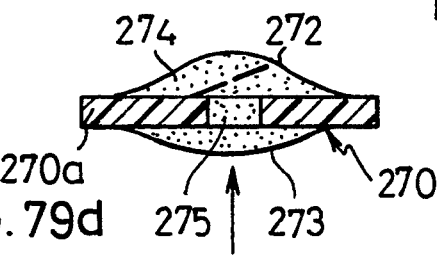

In another embodiment shown in FIGS. 71–75, the damper 260 is provided in the partition 260a with two through holes 265 of different diameters, and there are provided in the first chamber 262 a first check valve 265a with respect to smaller one of the through holes 265 for allowing the fluid to flow only from the second chamber 263 into the first chamber 262 and in the second chamber 263 a second check valve 265b with respect to larger one of the through holes 265 for allowing the fluid to flow only from the first chamber 262 into the second chamber 263. In this instance, the fluid flow from the first chamber 262 to the second chamber 263 through the larger hole is made faster than the other from the second chamber 263 into the first chamber 262, so as to provide a relatively low buffer action on the first chamber side (see in particular FIG. 74). In this case, the diameters of the respective through holes 265 as well as the size of the first and second check valves, position of the holes and the like are properly selected for optimumly setting the buffer effect by means of the first and second chambers 262 and 263. In this case, the first and second check valves 265a and 265b should desirably be formed in one of the stacked sheet members for forming the first or second chamber, as cut in a desired shape of the valve together with a through hole corresponding to one of the through holes 265, as shown in FIG. 75. In manufacturing the damper 260, such steps as shown in FIG. 62 may be employed with any proper modification.

Other arrangement of the damper 260 shown in FIGS. 71–75 is the same as that in the damper 10 or 90 shown in FIGS. 1, 5 and 6 or in FIGS. 29 and 30, and substantially the same constituents as those in the damper 10 or 90 are denoted in FIGS. 71–75 by the same reference numerals as those in FIGS. 1, 5 and 6 or in FIGS. 29 and 30 but with "250" or "170" added.

Figure 80:
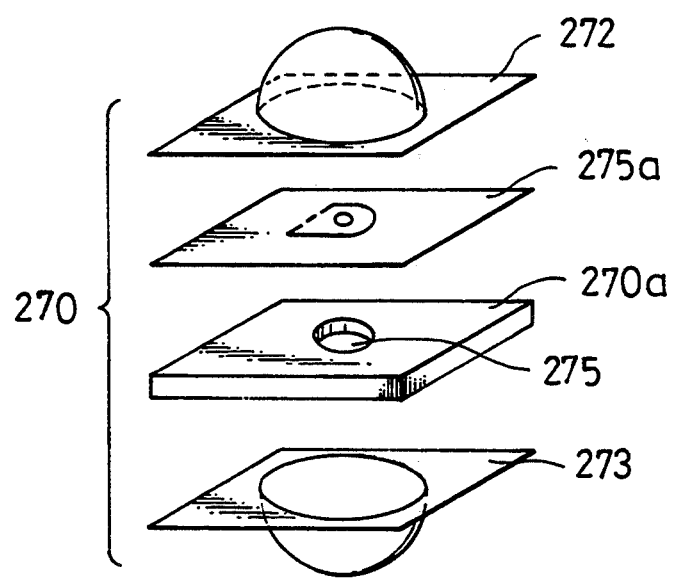
FIG. 80 shows in a perspective view as disassembled of the damper of FIG. 76.
Figure 81A:
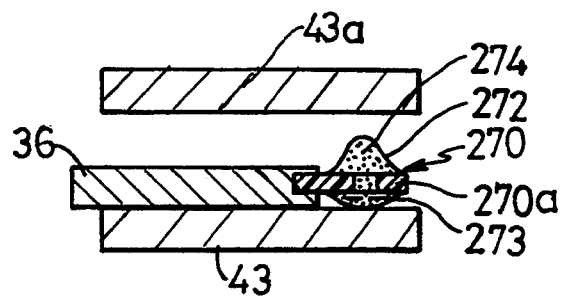
FIGS. 81a through 81d are explanatory views for the operation of the damper of FIG. 76 as employed in the relay.
Figure 81B:
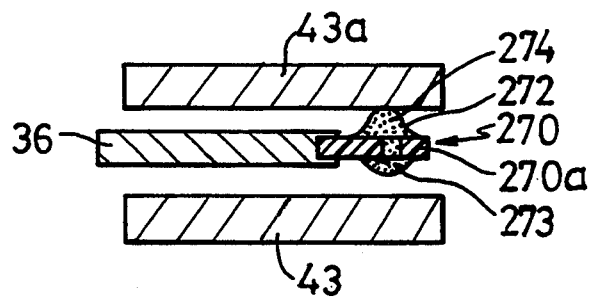
Figure 81C:
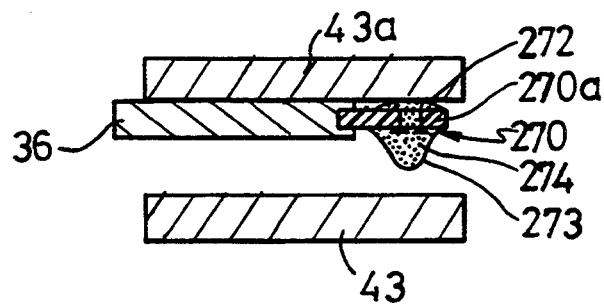
Figure 81D:
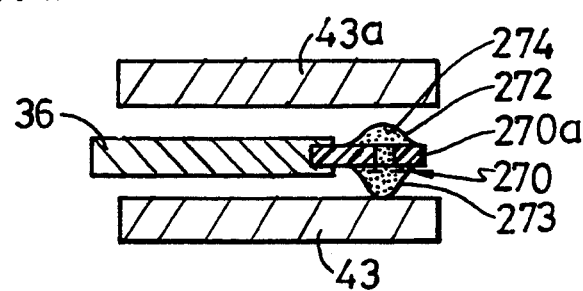

In another embodiment shown in FIGS. 76–81, the damper 270 is provided in the first chamber 272 with a check valve 275a having a small central hole, with respect to the through hole 275 made in the partition, for restricting the fluid flow from the first chamber 272 to the second chamber 273. As will be seen in FIGS. 79a–79d, the fluid flow from the first chamber 272 to the second chamber 273 occurs only through the thin hole made in the check valve 275a, so that the flow resistance can be increased to have a high buffer action provided. To the contrary, the flow from the second chamber 273 to the first chamber 272 is made faster with the check valve 275a opened, and a relatively low buffer action is provided. In the present instance, too, the check valve 275a can be readily provided by cutting one of the sheet members for forming the first chamber, as will be clear when FIG. 80 is referred to, while the small hole is additionally made through the valve 275a to be positioned substantially in the center of the through hole 275.

As will be also clear from FIGS. 81a–81d, the damper 270 employed in the relay can provide the lower buffer effect with the first chamber 272 which faces the armature 43a, and the higher buffer effect with the second chamber 273 facing the other armature 43. In this instance, the damper 270 attains in response to the operation of the card 41 such sequential operation as shown in FIGS. 81a through 81d, which is repeated as turned from the state of FIG. 81d to the state of FIG. 81a, as will be readily appreciated.

Other arrangement of the damper 270 shown in FIGS. 76–81 is the same as that in the damper 10 or 90 shown in FIGS. 1, 5 and 6 or in FIGS. 29 and 30, and substantially the same constituents as those in the damper 10 or 90 are denoted in FIGS. 76–81 by the same reference numerals as those in FIGS. 1, 5 and 6 or FIGS. 29 and 30 but with "260" or "180" added.

What is claimed is:

1. Apparatus comprising first and second relatively movable members and a damper disposed between said members, said members being normally separated from one another and movable toward one another, said damper including a container comprised of thin flexible sheet material forming a fluid-containing chamber arrangement which includes a plurality of interconnected compressible chambers, said chamber arrangement being positioned such that a first of said chambers is compressed by a force of compression between said members in response to relative movement of said members toward one another while a second of said chambers is uncompressed by said force of compression, such that fluid compressed in said first chamber is displaced into said second chamber and expands said second chamber while damping the relative movement between said members, said second chamber being arranged for expandable independently of external forces other than a force imposed by the incoming fluid displaced thereto by said force of compression.

2. A damper comprising a container comprised of thin flexible sheet material and forming a fluid-containing chamber arrangement which includes a plurality of interconnected compressible chambers, said chamber arrangement being positioned such that one of said chambers is compressed by a force of compression while at least another of said chambers is uncompressed by said force of compression, such that fluid compressed in said one chamber is displaced into at least said another chamber and expands said another chamber while damping the force of compression, said another chamber being expanded independently of external forces other than a force imposed by the incoming fluid displaced thereto by the force of compression.

3. Apparatus comprising a movable member, and a damper disposed in the course of a movement of said movable member for damping a speed and force of such movement, said damper including a container comprised of thin flexible sheet material and forming a fluid-containing chamber arrangement which includes a plurality of interconnected compressible chambers, said chamber arrangement being positioned such that one of said chambers is compressed by a force of compression in response to said movement of said movable member while at least another of said chambers is uncompressed by said force of compression, such that fluid compressed in said one chamber is displaced into at least said another chamber and expands said another chamber while damping the velocity and movement of said movable member, said another chamber being expanded independently of external forces other than a force imposed by the incoming fluid displaced thereto by said force of compression.

4. Apparatus according to claim 1, wherein said apparatus comprises an electromagnet assembly, said first member comprising a stationary core, and said second member comprising an armature movable for engagement and disengagement with respect to said core, an electromagnetic coil being provided for generating a magnetic flux between said core and said armature for electromagnetically attracting said armature to said core.

5. Apparatus according to claim 4, wherein said second member comprises two armatures movable into selective contact with respect first and second sides of said core, said damper being mounted on said core such that said first and second chambers are disposed on said first and second sides, respectively, of said core.

6. Apparatus according to claim 1, wherein said apparatus comprises a relay, said relay further including a casing, contact means disposed in said casing, and means for operating said contact including an electromagnet connected to said contact means, said electromagnet being comprised of said first and second members, said first member comprising a stationary core, and said second member comprising an armature movable for engagement and disengagement with respect to said core, an electromagnetic coil being provided for generating an electromagnetic flux between said core and said armature for electromagnetically attracting said armature to said core.

7. The damper according to claim 1, wherein said fluid is a liquid.

8. The damper according to claim 7, wherein said liquid is magnetic.

9. The damper according to claim 1, wherein said chambers include first and second chambers, and a communicating section which communicates said first and second chambers and is smaller in width than the first and second chambers to form a restriction to fluid flow.

10. The damper according to claim 1, wherein said container comprises two sheet members which are stacked and joined at peripheral edges thereof, and said chambers being defined between said two sheet members.

11. The damper according to claim 10, wherein said chamber arrangement is generally U-shaped, with said first and second chambers forming parallel legs of the U-shape.

12. The damper according to claim 1, which further comprises a partition disposed between said first and second chambers a through hole extending through said partition to communicate the chambers with one another.

13. The damper according to claim 7, wherein said liquid is a contact lubricating oil.

14. The damper according to claim 1, wherein said container is made of a plastics.

15. The damper according to claim 1, wherein at least part of said container is of a rubber material.

16. The damper according to claim 12, wherein said container is formed of two sheet members joined along their edges to define said chambers therebetween, said partition and sheet members are thermally joined.

17. The damper according to claim 12, wherein said container is formed of two sheet members joined along their edges to define said chambers therebetween, said partition and said sheet members are ultrasonic-welded.

18. The damper according to claim 12, which further comprises a holding member secured to an outer peripheral portion of said partition.

19. The damper according to claim 12, wherein said partition is divided in the thickness direction into a plurality of partition portions, and said plurality of partitions have respective through holes being mutually aligned and communicating said chambers.

20. The damper according to claim 12, wherein said through hole is formed to vary the flow rate depending on flow direction of the fluid.

21. The damper according to claim 20, wherein said through hole is made to have different opening degrees on opposite sides of said partition.

22. The damper according to claim 20, wherein said through hole is made to be slanted through the thickness of said partition.

23. The damper according to claim 12, wherein there is a plurality of said through holes.

24. The damper according to claim 20, which further comprises a valve means provided at said through hole for restraining said fluid from flowing in one flow direction between said chambers.

25. The damper according to claim 24, wherein said valve means includes means for allowing said fluid to flow in said one flow direction.

* * * * *